United States Patent
Johnson, Jr. et al.

(10) Patent No.: US 9,863,646 B2
(45) Date of Patent: Jan. 9, 2018

(54) MODULATION CONTROL OF HYDRONIC SYSTEMS

(76) Inventors: David E. Johnson, Jr., Indianapolis, IN (US); William A. Steinmeyer, Indianapolis, IN (US)

(*) Notice: Subject to any disclaimer, the term of this patent is extended or adjusted under 35 U.S.C. 154(b) by 782 days.

(21) Appl. No.: 13/603,227

(22) Filed: Sep. 4, 2012

(65) Prior Publication Data

US 2013/0048745 A1 Feb. 28, 2013

Related U.S. Application Data

(63) Continuation-in-part of application No. 11/949,314, filed on Dec. 3, 2007, now abandoned, which is a
(Continued)

(51) Int. Cl.
*G05D 23/19* (2006.01)
*F24D 12/02* (2006.01)
(Continued)

(52) U.S. Cl.
CPC .............. *F24D 12/02* (2013.01); *F01K 17/02* (2013.01); *F22B 35/00* (2013.01);
(Continued)

(58) Field of Classification Search
CPC ...... F22B 35/008; F23N 3/08; F24D 19/1009; G05D 23/1931; G05D 23/2439
(Continued)

(56) References Cited

U.S. PATENT DOCUMENTS

| 889,641 A | * | 6/1908 | Shipley | F23G 5/165 |
| | | | | 110/208 |
| 987,168 A | * | 3/1911 | Quinn | F23N 3/02 |
| | | | | 122/1 R |

(Continued)

FOREIGN PATENT DOCUMENTS

| EP | 98481 A2 * | 1/1984 | ............. F01K 23/06 |
| GB | 2206954 A | 1/1989 | |

(Continued)

OTHER PUBLICATIONS

"JP_63140236_A Cert Trans.pdf", Certified English Translation, U S P T O / Schreiber Translations, Inc., Apr. 2010.*
(Continued)

*Primary Examiner* — Gregory Huson
*Assistant Examiner* — Daniel E Namay
(74) *Attorney, Agent, or Firm* — Darrin Wesley Harris

(57) ABSTRACT

A hydronic heating system employing comprises a water line, two or more boilers, and a control. In operation, the water line facilitates a circulation of water through a building and the boilers heat the water as the water flows through the water line. The control calculates a system energy load for operating boilers. The calculation of the system energy load is a function of a set-point water temperature for the hydronic heating system, a supply water temperature of water flowing relative to a supply point of the water line, a return water temperature of water flowing relative to return point of the water line and a flow rate of water flowing relative to a flow sense point of the water line.

20 Claims, 14 Drawing Sheets

Related U.S. Application Data continuation-in-part of application No. 11/627,739, filed on Jan. 26, 2007, now Pat. No. 7,658,335.

(51) Int. Cl.

| | | |
|---|---|---|
| *F01K 17/02* | (2006.01) | |
| *F24D 19/10* | (2006.01) | |
| *F22B 35/00* | (2006.01) | |
| *G05B 11/42* | (2006.01) | |
| *F24H 9/20* | (2006.01) | |
| *C02F 1/66* | (2006.01) | |
| *C02F 5/00* | (2006.01) | |
| *C02F 103/02* | (2006.01) | |

(52) U.S. Cl.
CPC ..... *F24D 19/1009* (2013.01); *F24D 19/1012* (2013.01); *G05D 23/1932* (2013.01); *C02F 1/66* (2013.01); *C02F 5/00* (2013.01); *C02F 2103/02* (2013.01); *C02F 2303/08* (2013.01); *C02F 2303/22* (2013.01); *F24D 2200/043* (2013.01); *Y02B 30/108* (2013.01); *Y02B 30/14* (2013.01); *Y02B 30/16* (2013.01); *Y02B 30/745* (2013.01); *Y02B 30/762* (2013.01)

(58) Field of Classification Search
USPC ............... 237/8 A, 2 A, 8 R, 81; 122/448.3; 236/9 R, 9 A, 14, 91 D, 91 E, 91 F
IPC ............................................. G05D 23/19,11/42
See application file for complete search history.

(56) References Cited

U.S. PATENT DOCUMENTS

| | | | | |
|---|---|---|---|---|
| 998,568 | A * | 7/1911 | Fletcher | F22B 37/00 122/4 R |
| 1,167,343 | A * | 1/1916 | Gibson | F23N 1/02 110/101 C |
| 2,676,574 | A * | 4/1954 | Wenzel | F22D 11/06 122/448.3 |
| 2,780,206 | A | 2/1957 | La Rocque et al. | |
| 3,144,991 | A | 8/1964 | Marchant | |
| 3,387,589 | A * | 6/1968 | Chan | F22B 35/008 122/1 R |
| 3,421,691 | A | 1/1969 | Forbes | |
| 3,555,251 | A | 1/1971 | Shavit | |
| 3,576,177 | A | 4/1971 | Block et al. | |
| 4,337,893 | A * | 7/1982 | Flanders | F24D 12/02 236/1 EB |
| 4,370,949 | A * | 2/1983 | Beckett | F22B 33/00 122/20 B |
| 4,412,136 | A * | 10/1983 | Kaya | F22B 35/008 290/40 R |
| 4,430,573 | A * | 2/1984 | Kaya | F01K 13/02 290/40 R |
| 4,559,785 | A * | 12/1985 | Gaines | F22B 35/008 122/448.3 |
| 4,583,497 | A * | 4/1986 | Likins, Jr. | F22B 35/008 122/448.3 |
| 4,637,349 | A | 1/1987 | Robinson | |
| 4,694,783 | A | 9/1987 | Cleer, Jr. | |
| 4,745,758 | A * | 5/1988 | Putman | F01K 13/02 60/664 |
| 4,860,696 | A * | 8/1989 | Fujita | 122/448.3 |
| 4,864,972 | A | 9/1989 | Batey et al. | |
| 5,042,431 | A | 8/1991 | Shprecher et al. | |
| 5,172,654 | A * | 12/1992 | Christiansen | 122/448.3 |
| 5,452,687 | A | 9/1995 | Christiansen | |
| 5,655,710 | A * | 8/1997 | Kayahara et al. | 237/81 |
| 5,692,676 | A | 12/1997 | Walker | |
| 5,747,342 | A | 5/1998 | Zupanovich | |
| 6,006,009 | A * | 12/1999 | Friedheim | F22B 35/008 122/479.1 |
| 6,062,485 | A | 5/2000 | Stege et al. | |
| 6,299,071 | B1 | 10/2001 | Fiedrich | |
| 6,480,803 | B1 | 11/2002 | Pierret et al. | |
| 7,017,606 | B1 * | 3/2006 | Sanders | 137/563 |
| 7,803,489 | B2 * | 9/2010 | McCanney | 429/416 |
| 9,388,977 | B2 * | 7/2016 | Yamada | F22B 35/008 |
| 9,477,242 | B2 * | 10/2016 | Kovalcik | G05D 23/1919 |
| 2002/0011220 | A1 * | 1/2002 | Kayahara | F22B 35/008 122/396 |
| 2003/0144932 | A1 * | 7/2003 | Martin et al. | 705/32 |
| 2004/0069249 | A1 * | 4/2004 | Kemp et al. | 122/505 |
| 2005/0230490 | A1 | 10/2005 | Pouchak et al. | |
| 2006/0248897 | A1 * | 11/2006 | Haertel et al. | 60/775 |
| 2007/0023534 | A1 * | 2/2007 | Liu | 236/1 C |
| 2007/0235550 | A1 * | 10/2007 | Donath et al. | 237/1 R |
| 2008/0156236 | A1 * | 7/2008 | Ito et al. | 110/191 |
| 2008/0241614 | A1 * | 10/2008 | McCanney | 429/20 |

FOREIGN PATENT DOCUMENTS

| | | | | |
|---|---|---|---|---|
| JP | 60114905 | A * | 6/1985 | ............ F22B 35/008 |
| JP | 63140236 | A | 6/1988 | |
| JP | 10103605 | A * | 4/1998 | ............ F22B 35/00 |
| JP | 2010091139 | A * | 4/2010 | ............ F22B 35/008 |
| JP | 2013234775 | A * | 11/2013 | ............ F22B 35/008 |
| JP | 2014044037 | A * | 3/2014 | ............ F22B 35/008 |

OTHER PUBLICATIONS

Heat-Timer Corp., Installation and Operation Instructions for Mini-Mod and Mini-Extension, Sequencing Modulating Control for Hydronic Heating Systems, p. 107.
Heat-Timer Corp., Model MOD-4, Installation & Operation Manual, pp. 1-47.
Heat-Timer Corp., Multi-Mod Installation & Operation Manual, pp. 1-36.
Heat-Timer Corp., Control System Specification, Mini-Mod and Mini-Extension.
Non-Final Rejection Office Action for U.S. Appl. No. 11/949,314 dated May 14, 2009.
Response to Non-Final Rejection Office Action for U.S. Appl. No. 11/949,314 dated Aug. 14, 2009.
Final Rejection Office Action for U.S. Appl. No. 11/949,314 dated Dec. 1, 2009.
Response to Final Rejection Office Action for U.S. Appl. No. 11/949,314 dated Apr. 1, 2010.
Non-Final Rejection Office Action for U.S. Appl. No. 11/949,314 dated Apr. 29, 2010.
Response to Non-Final Rejection Office Action for U.S. Appl. No. 11/949,314 dated Jul. 29, 2010.
Final Rejection Office Action for U.S. Appl. No. 11/949,314 dated Oct. 18, 2010.
Response to Final Rejection Office Action for U.S. Appl. No. 11/949,314 dated Apr. 18, 2011.
Non-Final Rejection Office Action for U.S. Appl. No. 11/949,314 dated Apr. 28, 2011.
Response to Non-Final Rejection Office Action for U.S. Appl. No. 11/949,314 dated Oct. 26, 2011.
Final Rejection Office Action for U.S. Appl. No. 11/949,314 dated Mar. 2, 2012.
Non-Final Rejection Office Action for U.S. Appl. No. 11/627,739 dated May 13, 2009.
Response to Non-Final Rejection Office Action for U.S. Appl. No. 11/627,739 dated Aug. 14, 2009.

* cited by examiner

MODULATION CONTROL OF HYDRONIC SYSTEMS

CROSS-REFERENCE TO RELATED APPLICATIONS

The present application is a continuation-in-part of U.S. application Ser. No. 11/949,314 entitled "Modulation Control of a Hydronic Heating System", filed Dec. 3, 2007, which is a continuation-in-part of U.S. application Ser. No. 11/627,739, entitled "Hydronic Heating System", filed Jan. 26, 2007 (collectively the "Priority Applications"). This present application claims priority and benefit of the Priority Applications to the extent the subject matter of this present application is found in the Priority Applications. The content of the Priority Applications is incorporated herein by reference.

TECHNICAL FIELD

The present disclosure generally relates to modulation or control of various hydronic systems utilizing one or more energy sources for particular purposes, such as, for example, systems utilizing natural gas, oil, coal, gasoline, steam, water, and/or electricity for purposes of providing heating, cooling, pumping, current output, and/or mechanical energy. The present disclosure specifically relates to an energy-based modulation control of such hydronic systems.

BACKGROUND

Temperature-based modulation control schemes of boilers as known in the art are generally premised on operating the boilers as temperature devices based on an error calculation between a set-point temperature and a supply temperature. More particularly, in response to the supply temperature being less than the set-point temperature, the temperature-based modulation control scheme would ramp up the heating output of one or more of the boilers until the supply temperature equaled the set-point temperature. Conversely, in response to the supply temperature being greater than the set-point temperature, the temperature-based modulation control scheme would ramp down the heating output of one or more of the boilers until the supply temperature equaled the set-point temperature.

SUMMARY

While in practice the temperature-based modulation control schemes may have involved various subcontrol features (e.g., a proportional-integral-derivative control feature of the ramping up/ramping down of boiler(s) or a timing control feature for enabling/disabling boiler(s), it has now been discovered that the operation of the boilers as temperature devices impedes efficient operation of the boilers for various reasons, primarily the absence of a calculation of a real-time heating load also known herein as an energy load or system energy load.

The present disclosure is directed to an energy load based modulation scheme of boilers generally premised on operating the boilers as energy devices based on a calculation of a real-time heating load/energy load.

One form of the present disclosure is a hydronic heating system with a water line, two or more boilers and a control. In operation, the water line facilitates a circulation of water through a building and the boilers heat the water as the water flows through the water line. The control calculates a system energy load for operating boilers. The calculation of the system energy load is a function of a set-point water temperature for the hydronic heating system, a supply water temperature of water flowing relative to a supply point of the water line, a return water temperature of water flowing relative to return point of the water line, and a flow rate of water flowing relative to a flow sense point of the water line.

The foregoing form and other forms of the present disclosure as well as various features and advantages of the present disclosure will become further apparent from the following detailed description of various embodiments of the present disclosure read in conjunction with the accompanying drawings. The detailed description and drawings are merely illustrative of the present disclosure rather than limiting, the scope of the present disclosure being defined by the appended claims and equivalents thereof.

DETAILED DESCRIPTION

Figure 1:
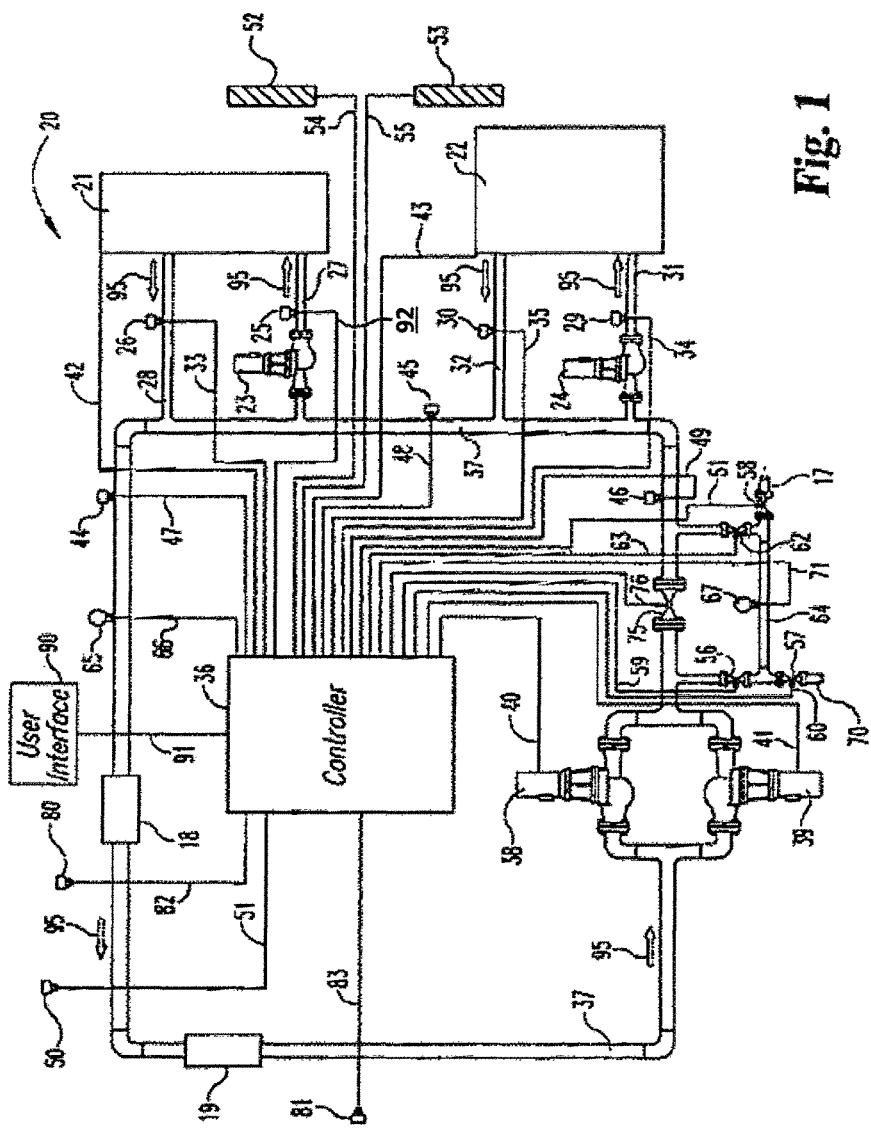
FIG. 1 is a schematic and block diagram of an embodiment of the present disclosure, illustrating a hybrid heating system having two boilers.

For the purposes of promoting an understanding of the principles of the disclosure, reference will now be made to the embodiments illustrated in the drawings, and specific language will be used to describe the same. It will nevertheless be understood that no limitation of the scope of the disclosure is thereby intended, and alterations and modifications in the illustrated examples, and further applications of the principles of the disclosure as illustrated therein are herein contemplated as would normally occur to one skilled in the art to which the disclosure relates.

Referring to FIG. 1, there is shown a hydronic (i.e., hot water) heating system 20 that includes boilers 21 and 22 for heating water that is circulated in order to heat a building. Boilers 21 and 22 may both be condensing or non-condensing boilers, or one boiler may be a condensing boiler while the other is a non-condensing boiler. Boilers 21 and 22 are respectively associated with pumps 23 and 24 that act to provide circulation of the heated water throughout the building. Controller 36 is operably connected to boilers 21 and 22 via connectors 42 and 43 respectively. Connectors 42 and 43 are illustratively shown as being a cable or wire, but connectors 42 and 43, as well as other connectors described and shown herein, may take the form of an apparatus or functionality consistent with any technology known to those skilled in the art and appropriate for the purpose and application described (e.g., wireless transmission technology). Controller 36 provides signals that control the operation of boilers 21 and 22, including the operation of their respective boiler pumps 23 and 24. A temperature sensor 25 is located to measure the water temperature in boiler inlet or return water line 27 of boiler 21. Temperature sensor 25 is operably connected to controller 36 via connector 92. Temperature sensor 26 is located to measure the water temperature in outlet or system supply water line 28 of boiler 21 and is operably connected to controller 36 via connector 33. Similarly, a temperature sensor 29 is located to measure the water temperature in inlet or return water line 31 of boiler 22. Temperature sensor 29 is operably connected to controller 36 via connector 34. Temperature sensor 30 is located to measure the water temperature in outlet or system supply water line 32 of boiler 22 and is operably connected to controller 36 via connector 35.

Water lines 27, 28, 31, and 32 are connected to the main circulating water line 37 that circulates heated water through heat transmission devices 18 and 19 (e.g., heat exchangers, radiators, or air handlers) located at various points throughout the building to heat the building. Auxiliary pumps 38 and 39 are connected to main water line 37 to assist the water flow. Pumps 38 and 39 are connected via connectors 40 and 41, respectively, to controller 36 to provide control of pumps 38 and 39. Water flow direction in heating system 20 is indicated by arrows 95 in FIG. 1.

Additional temperature sensors 44, 45, and 46 are located along main water line 37 to measure the temperature of the water at that location, and return the temperature data via data lines 47, 48, and 49, respectively, to controller 36, although it is understood that temperature data may be returned in a non-wired manner, e.g., wireless transmission, as would be known to those skilled in the art. Sensor 44 is illustratively shown as being located in the vicinity of the outgoing heated water from boilers 21 and 22, respectively. Sensor 45 is illustratively shown as being located in between boilers 21 and 22 to measure water temperature in the return portion of main water line 37. Sensor 46 is illustratively shown as being located in the return water flow from heat transmission devices 18 and 19 to boilers 21 and 22. An outside air temperature sensor 50 is connected to controller 36 via data line 51 to provide measurements of outside air temperature to controller 36 of heating system 20.

Air temperature sensors 80 and 81 are illustratively shown as being connected to controller 36 via connectors 82 and 83, respectively. Air temperature sensors 80 and 81 are illustratively located in rooms or areas of the building to be heated, and provide data to controller 36 regarding the ambient temperature of those rooms or areas.

Dampers 52 and 53 are illustratively shown as being controlled via connectors 54 and 55, respectively, by controller 36 for controlling outside air flow to boilers 21 and 22, respectively, in order to provide free air make-up to boilers 21 and 22. Flow valves 56, 57, 58, and 62 are illustratively shown as being connected to and controlled by controller 36 via connectors 59, 60, 61, and 63, respectively. The rate and quantity of soft or conditioned water supplied to flush by-pass or sidestream water line 64 via incoming water line 70, in order to maintain calibration of pH meter 67 located in sidestream water line 64, is controlled by way of flow valves 57 and 58. Water is drained from main water line 37 via drain line 17 by way of flow valves 56 and 58. pH meter 67 measures the pH of the water within main water line 37. Main valve 75 is located within main water line 37 and is illustratively shown as being connected to controller 36 by connector 76 to force water flow through sidestream water line 64. Connector 71 connects pH meter 67 to controller 36. Flow measuring device 65 is mounted to main water line 37 and provides flow data via connector 66 to controller 36. A user interface 90, e.g., computer input screen, is illustratively shown as being connected to controller 36 by way of connector 91.

It will be understood that the system of FIG. 1 is illustrative in nature and is not limited to any specific number of boilers, any particular piping arrangement of the various water lines, valves, sensors or controls shown in the drawings, which will in operation depend upon particular building requirements.

Figure 2:
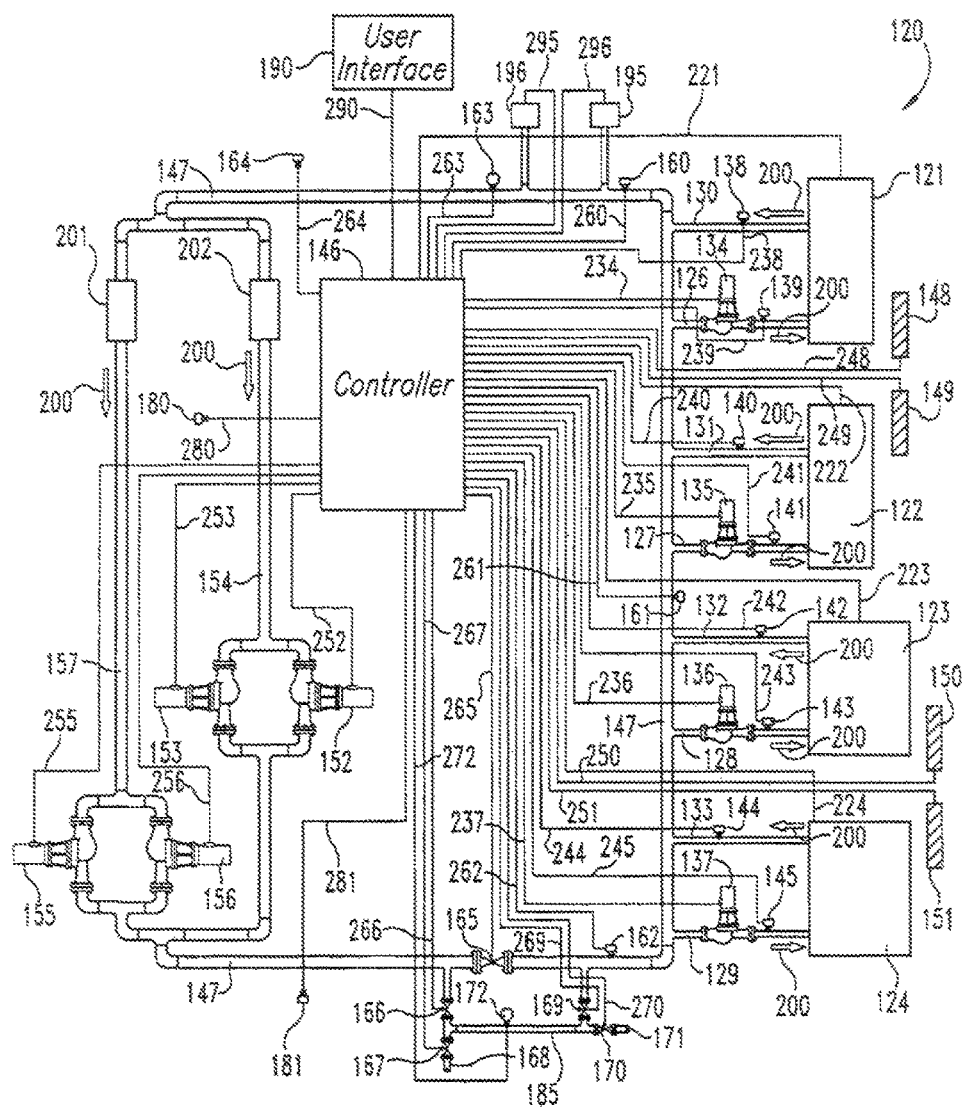
FIG. 2 is a schematic and block diagram of an embodiment of the present disclosure, illustrating a hybrid heating system having four boilers.

To further illustrate the non-limiting nature of the present disclosure, reference is now made to FIG. 2, which illustrates a heating system 120. Heating system 120 illustratively includes non-condensing boilers 121 and 122 and condensing boilers 123 and 124 connected to a main water circulation line 147 by inlet or boiler return water lines 126, 127, 128, and 129, respectively and outlet or system supply water lines 130, 131, 132, and 133, respectively. Boilers 121, 122, 123, and 124 are respectively associated with pumps 134, 135, 136, and 137 which are mounted on the boiler return water lines 126, 127, 128, and 129, respectively. Pumps 134, 135, 136, and 137 are preferably enabled with variable frequency drive circuitry that allows the pumps to be operated at variable speeds, i.e., pumping rates. Similar to heating system 20 of FIG. 1, heating system 120 of FIG. 2 includes temperature sensors 138, 140, 142, and 144 mounted on the outlet or system supply water lines 130, 131, 132, and 133, respectively, and temperature sensors 139, 141, 143, and 145 mounted on the inlet or return water lines 126, 127, 128, and 129, respectively. Boilers 121, 122, 123, and 124 are operably connected to controller 146 via connectors 221, 222, 223, and 224, respectively. Pumps 134, 135, 136, and 137 are operably connected to controller 146 via connectors 234, 235, 236, and 237, respectively. Temperature sensors 138, 139, 140, 141, 142, 143, 144, and 145 are operably connected to a controller 146 via connectors 238, 239, 240, 241, 242, 243, 244, and 245, respectively. While FIG. 2 shows controller 146 connected to the various components herein described via hard wired control or connection lines or wires, it will be understood that various wireless connections are envisioned including, but not limited to, IR, RF, and optical links. In addition, control and sensor data may be communicated via various network interfaces and protocols including parallel or serial data buses, Ethernet, Bluetooth, IEEE standard control interfaces, or other computer or data networks that are known to those of ordinary skill in the art both now and as may be developed in the future.

Boilers 121, 122, 123, and 124 include air dampers 148, 149, 150, and 151, which are also operably connected to controller 146 via connectors 248, 249, 250, and 251, respectively. Controller 146 may independently control the operation of air dampers 148, 149, 150, and 151 via switching or control signals, e.g., digital signals, sent to dampers 148, 149, 150, and 151 via connectors 248, 249, 250, and 251 to control the outside or free air make-up to boilers 121, 122, 123, and 124, respectively. Auxiliary pumps 152 and 153 pump or circulate water through secondary water line 154 of main water line 147 and are operated by controller 146 via connectors 252 and 253, respectively. Auxiliary pumps 155 and 156 pump or circulate water through secondary water line 157 and are operated by controller 146 via connectors 255 and 256, respectively. Water flow direction through system 120 is illustratively shown by arrows 200.

Valves 167 and 170 are connected to and controlled by controller 146 via connectors 267 and 270, respectively, to provide soft or conditioned water via inlet line 168 to flush sidestream 185 as necessary to maintain the calibration of pH meter 172. Controller 146 is also operably connected to sidestream valves 166 and 169 via connectors 266 and 269, respectively, to control the flow of water from main water line 147 to a pH measurement sidestream water line 185. A pH meter 172 is provided to measure the pH of the water circulating throughout system 120. pH meter 172 is shown as being mounted in pH measurement sidestream 185 and operably connected to controller 146 via connector 272. Main valve 165 is mounted within main water line 147 and is also operably connected to controller 146 via connector 265. Controller 146 operates main valve 165 to force the flow of water through pH measurement sidestream 185. A weak acid pump 195 and a weak base pump 196 are illustratively shown as being coupled into main water line 147. Acid pump 195 and base pump 196 are shown as being operably connected to controller 146 via connectors 295 and 296, respectively. Controlling the pH of the water circulating through main water line 147 is important to prevent premature failure or wear with respect to the components of heating system 120 due to overly acidic or basic water. Through the operation of valves 165, 166, 167, 169, and 170 by controller 146 by signals via connectors 265, 266, 267, 269, and 270, respectively, periodic checks of the pH of the water in main water line 147 can be made by diverting some water into sidestream 185 and measuring its pH by pH measurement sensor 172 and returning that data to controller 146 via connector 272. If the water requires an adjustment of its pH, controller 146 can initiate the operation of weak acid pump 195 or weak base pump 196 by signals sent via connectors 295 or 296, respectively, as needed to restore the pH of the water in main water line 147 to a satisfactory level.

Temperature sensors 160, 161, and 162 are mounted to main water line 147 to measure the temperature of the circulating water at various locations along main water line 147. Sensors 160, 161, and 162 are shown as being operably connected to controller 146 via connectors 260, 261, and 262, respectively. A flow measuring device 163 is shown as being mounted on main water line 147 to provide water flow information to controller 146 via connector 263. An outdoor air temperature sensor 164 is mounted outside the building and is operably connected to controller 146 via connector 264. Air temperature sensors 180 and 181 are located in rooms or areas of the building and are also operably connected to controller 146 via connectors 280 and 281, respectively, to provide information with respect to the ambient temperature of the rooms or areas in which the sensors are located. FIG. 2 illustratively shows heat transmission devices 201 and 202 located within system 120. Devices 201 and 202 may be end-user heat distribution apparatus, such as radiators, heat exchangers, or air handlers, for only a few examples. A user interface device 190 is also operably connected to controller 146 via connector 290 to allow a user of heating system 120 to select or change various input criteria, e.g., desired room temperature or the manner in which heating system 120 is operated. User interface device 190 also provides a means for information regarding the status or condition of the components of system 120 to be communicated to the user.

The piping configuration of main water line 37 shown in FIG. 1 and main water line 147 shown in FIG. 2 locates the condensing boilers 123 and 124 upstream from the non-condensing boilers 121 and 122 such that during the time the condensing boilers are enabled, their operation will pre-heat the water flowing to the non-condensing boilers, thereby increasing the efficiency of the non-condensing boilers and acting to prevent the non-condensing boilers from condensing, thereby protecting the non-condensing boilers from the detrimental effects of condensation.

As previously described, the present disclosure does not limit the number or types of boilers that can be used within a heating system. For purposes of explaining the operation of a heating system constructed in accordance with the present disclosure, reference will be made to FIGS. 3-7 which, for example only, illustrate elements of a hydronic heating system that includes two condensing and two non-condensing boilers in an arrangement such as that shown in FIG. 2. Reference will therefore be made primarily to FIG. 2, although it is understood that the principles of operation to be described apply equally to heating systems having different numbers and types of boilers, including but not limited to the system of FIG. 1.

Figure 3:
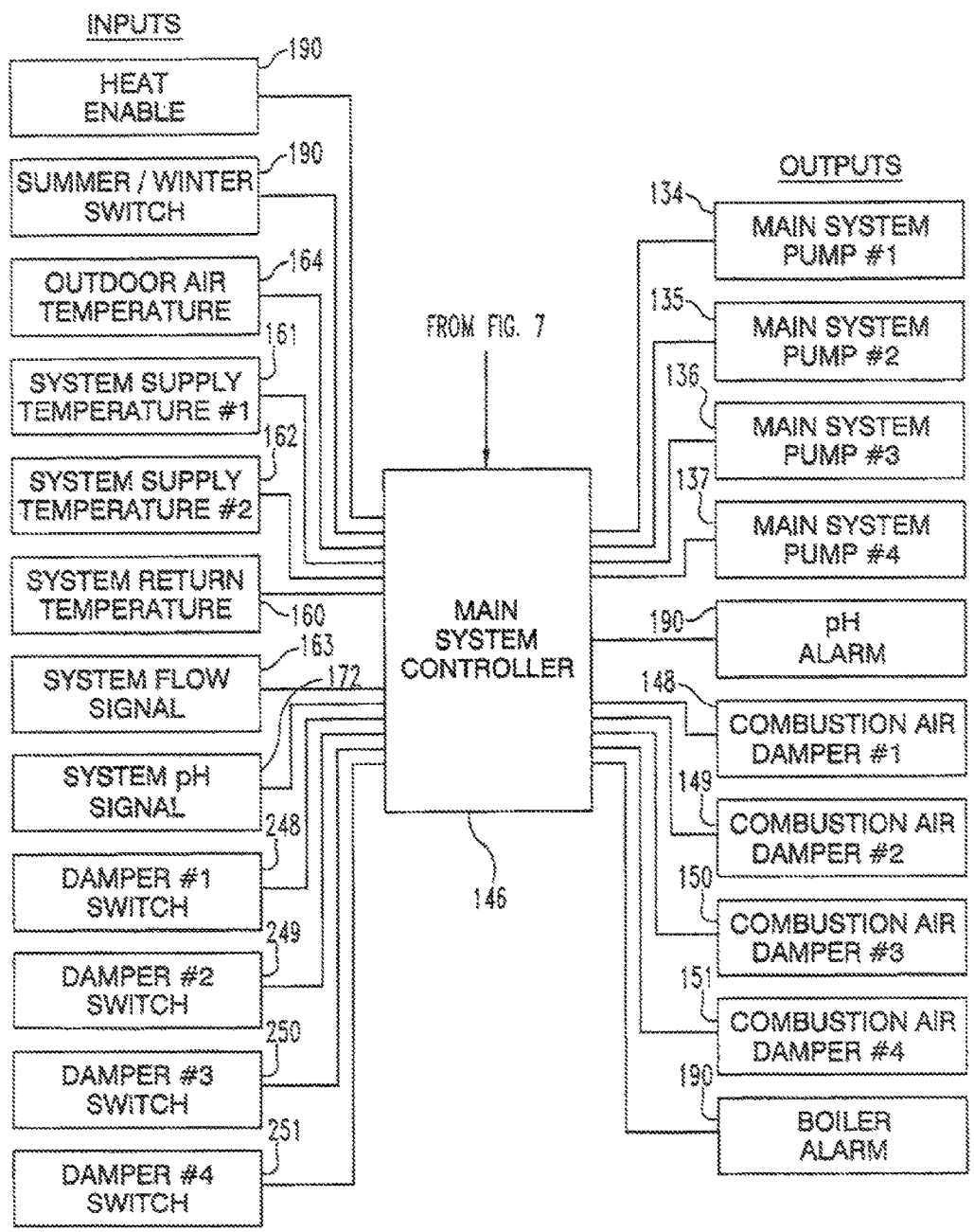
FIG. 3 is a schematic and block diagram of the main control circuit used in a heating system constructed in accordance with an embodiment of the present disclosure.
Figure 4:
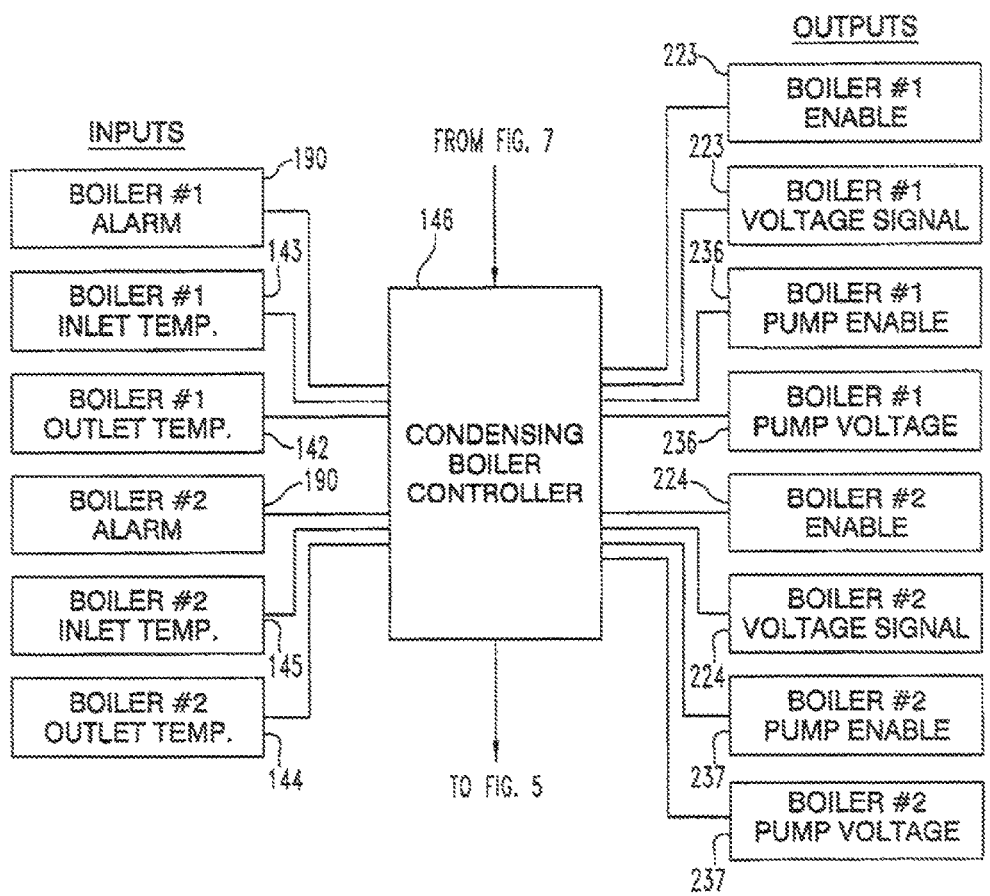
FIG. 4 is a schematic and block diagram of condensing boiler control circuitry used in a heating system constructed in accordance with an embodiment of the present disclosure.
Figure 5:
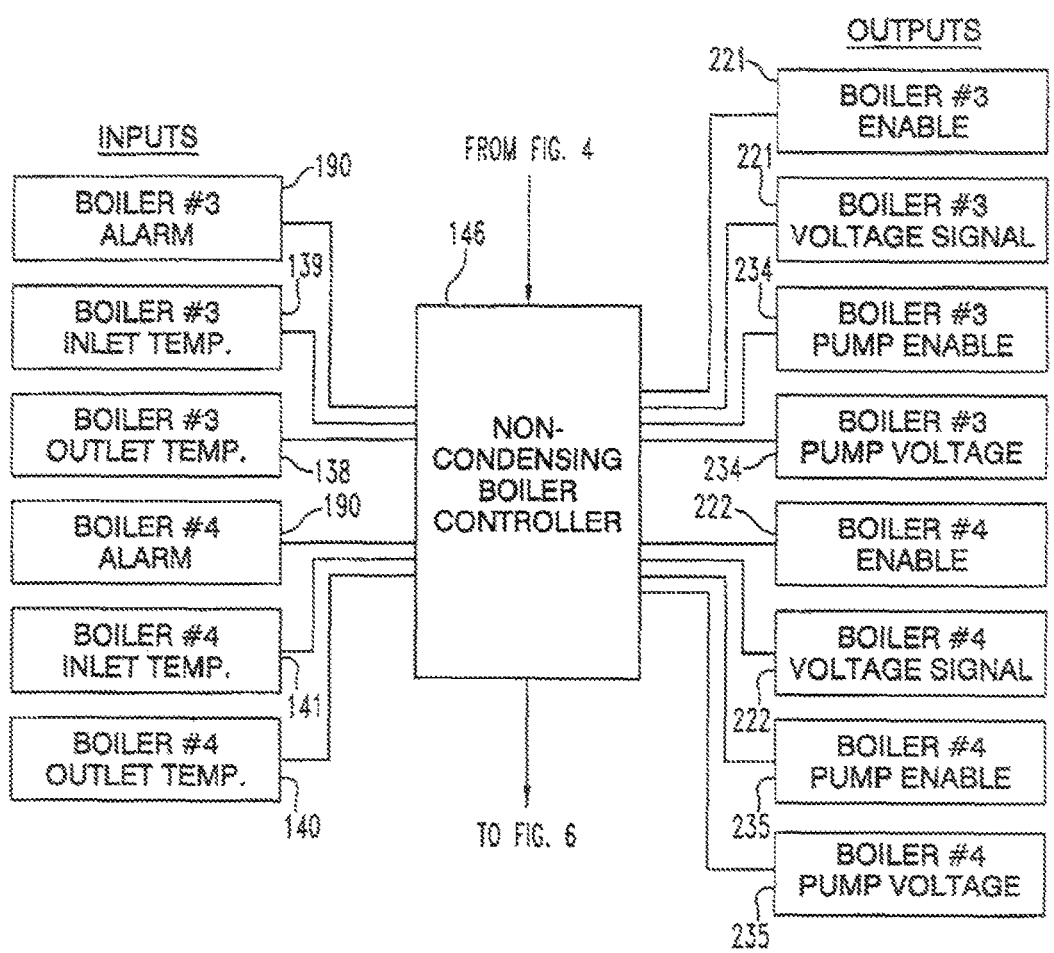
FIG. 5 is a schematic and block diagram of non-condensing boiler control circuitry used in a heating system constructed in accordance with an embodiment of the present disclosure.
Figure 6:
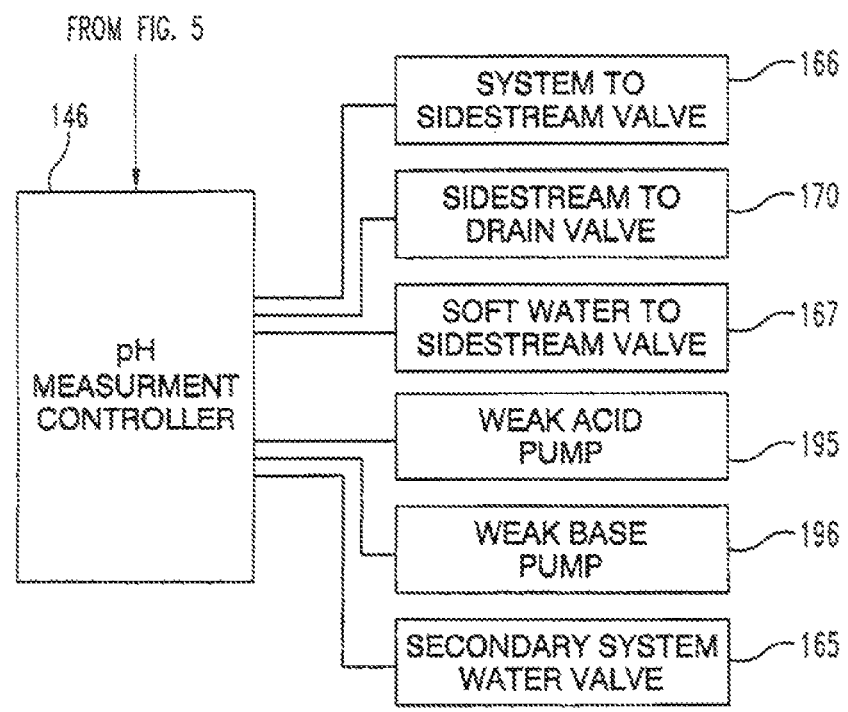
FIG. 6 is a schematic and block diagram of a pH measurement control circuit used in a heating system constructed in accordance with an embodiment of the present disclosure.

FIG. 3 illustrates the presence of a main system controller and its associated input and output signals and functions. FIG. 4 illustrates the presence of a condensing boiler controller and its associated input and output signals and functions. FIG. 5 illustrates a non-condensing boiler controller with its associated input and output signals and functions, and FIG. 6 illustrates a pH measurement controller and its associated input and output signals and functions.

Figure 7:
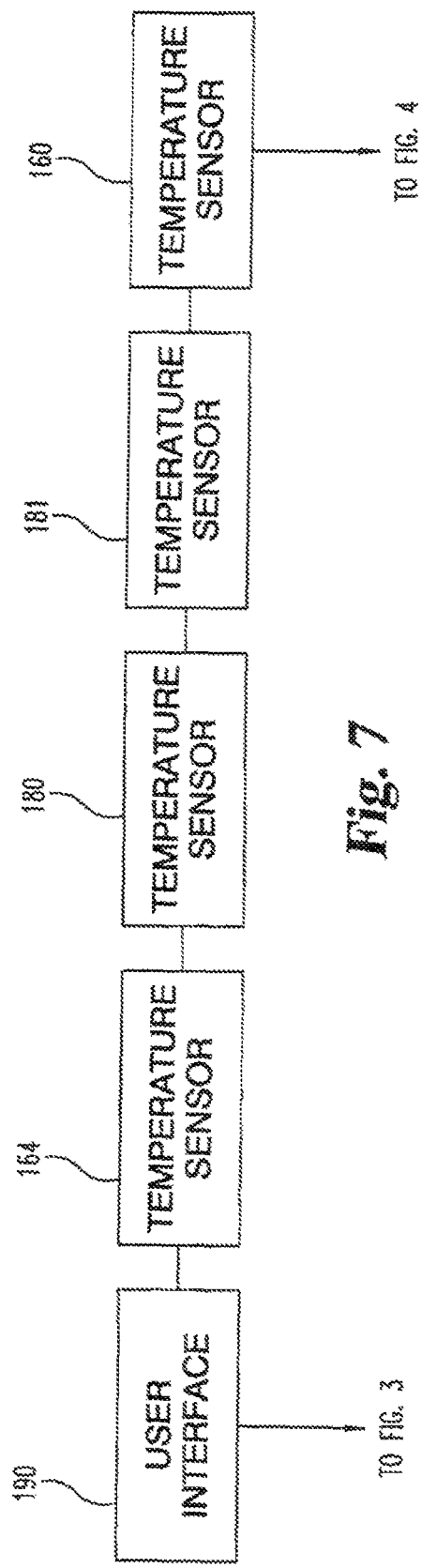
FIG. 7 is a schematic and block diagram illustrating a number of temperature sensor circuits, as well as a user interface circuit used in a heating system constructed in accordance with an embodiment of the present disclosure.

It is understood that while separate or individual controllers can of course be used, a unitary controller, such as controller 36 or 146, may comprise the functionality of each of the controller elements shown in FIGS. 3-6 in the physical embodiment of a single device. Therefore, for purposes of simplifying the following explanation, each of the controller devices in FIGS. 3-6 will be identified by reference number 146. Additionally, while FIGS. 3-7 may illustrate elements that contain language that suggests a function or type of information, that element may be identified by a reference number that corresponds to the physical device shown in FIG. 2 that performs such function or provides such information. FIG. 7 illustrates a representation of the functionality within heating system 120 of user interface 190 as well as a number of representative temperature sensors, e.g., sensors 160, 164, 180, and 181.

Through the use of user interface device 190, the type of each boiler 121-124 (e.g., condensing or non-condensing) will be inputted by the user. Minimum and maximum return and supply temperatures for each of boilers 121-124, as defined by the boiler manufacturer, will be inputted by the user as well. The outdoor air temperature switch point, i.e., the temperature above which a condensing-type boiler is initially selected, may also be provided to system 120 via user interface device 190. Using data provided by interface device 190 and the outdoor air temperature provided by sensor 164 via connector 264, controller 146 will enable at least one of pumps 134-137 via their respective connectors 234-237. After a user-defined delay (e.g., 1 to 10 minutes), a flow reading using flow sensor 163 in the main water line 147 will be taken. Using this flow data provided via connector 263, as well as other initializing data, controller 146 calculates an initial building heating load for system 120. Based on this calculated load and the outdoor air temperature switch point, controller 146 will determine which type of boiler (e.g., condensing or non-condensing) to initially enable. For example, if the outdoor air temperature calls for a condensing boiler, and there is more than one condensing boiler available in system 120, then the first boiler selected can be based on which one has accumulated the fewest hours of operation. This may be done by comparing timers linked with each boiler's respective output enable circuits, unless a particular boiler in the system has been designated a dedicated lead boiler, in which case it will always be enabled or fired first. Since controller 146 also knows the output capability of each boiler on the system, controller 146 may also select for operation the boiler having an output that is most closely matched to the building heating load. If the condition should exist that a particular boiler is in an alarm state (i.e., the boiler is not working properly), controller 146 will not enable that boiler until the condition causing the alarm is remedied. For purposes of this example, condensing boiler 124 is initially enabled by controller 146 via connector 224. After an initial period of low-fire output of boiler 124, the building heating load will be recalculated to obtain a real-time heating load. This low-fire time delay, e.g., 30 minutes, is used to ensure that the initial calculated building heating load is accurate so as to avoid overshooting the desired building temperature by overfiring the initially enabled or fired boiler or boilers. If the recalculated real-time heating load indicates that heat is still required, the initially enabled boiler 124 will thereafter by operated in its normal or real-time mode, e.g., via proportional-integral-derivative (PID) control, by controller 146 via connector 224.

The operation of the PID mode of controller 146 will be constantly monitored. If controller 146 causes the output of boiler 124 to remain above a user-defined output percentage (e.g., 25%-100%) for a given user-defined time period (e.g., 5-60 minutes), then a second boiler, e.g., condensing boiler 123, will be enabled via connector 223, and controller 146 will split the real-time heating load between the two enabled boilers 124 and 123 in a manner that operates both boilers as efficiently as possible. The real-time heating load distribution between boilers 124 and 123 is monitored often (e.g., once per second) to ensure boilers 124 and 123 continue to be operated as efficiently as possible. In this exemplary embodiment, if the real-time heating load increases, this pattern of sequencing will continue until all boilers of a particular type (e.g., condensing or non-condensing) that exist in a given heating system have been enabled or fired. Should the outdoor air temperature remain above the condensing/non-condensing switch point and all condensing boilers, in this case boilers 124 and 123, have been operating at a user-defined maximum output for a user-defined period of time, and a user-defined heating load percentage (e.g., 1-10%) has not been reached, a non-condensing boiler, e.g., boiler 122 will then be enabled by an enabling signal via connector 222. Once non-condensing boiler 122 has been enabled, condensing boilers 124 and 123, that are still enabled, will be reset to cover that portion of the real-time heating load that still allows non-condensing boiler 122 to maintain its minimum recommended return water temperature. Non-condensing boiler 122 will operate under PID control to cover the balance of the real-time heating load. Should the real-time heating load increase, the non-condensing boilers will follow the same sequencing control described above to enable and control additional non-condensing boilers, e.g., boiler 121, and boiler pumps, e.g., pump 134. During the run cycles of both condensing and non-condensing boiler reset loops, building zone temperatures will be polled by networked temperature devices, e.g., sensors 180 and 181, to determine if the output (i.e., supply temperature) of system 120 is meeting the real-time heating load. Based on this information, boiler reset temperatures will be increased to supply more heat if needed, decreased to increase efficiency of boiler operation, or left the same. This polling enables controller 146 to know how much energy has been used to heat the building and, based on the calculated real-time heating load, enable only the boiler or boilers needed to most efficiently meet the remaining real-time heating load.

Once the real-time heating load covered by condensing boilers 124 and 123 has been satisfied, condensing boilers 124 and 123 will be shut down by controller 146 by signals provided via connectors 224 and 223, respectively. Condensing boilers 124 and 123 will be enabled again only if the return water temperature of non-condensing boilers 121 and 122 (if enabled) falls below a user defined limit (e.g., 130° F.) and remains there for more than a user-defined period of time (e.g., 5-30 minutes), or if the outdoor air temperature rises above the condensing/non-condensing switch point, or if all the non-condensing boilers, in this case boilers 121 and 122, are operating at a user-defined maximum output for a user-defined period of time (e.g., 15-60 minutes) and have failed to adequately satisfy the real-time heating load. As the real-time heating load is satisfied or reduced, a non-condensing boiler will be shut down by controller 146. The boiler selected for shut down is chosen based on hours of operation. As the real-time heating load continues to decrease, additional boilers will be shut down.

Boiler operating regulations require that a boiler must be shut down at least once every 24 hours. In order to comply with this requirement and to even wear across boilers, system 120 operates such that each boiler 121-124 is shut down at least once every six hours. This process allows controller 146 to regularly compare hours of accumulated operation and enable or fire the boiler of a given type with the least operating hours first. If the real-time heating load of the building is determined to be less than the minimum operating range of all the available boilers 121-124 on system 120, controller 146 will select and enable the boiler having the lowest operating range. This functionality of controller 146 will help to eliminate as much as possible the efficiency losses and significant wear effects of short cycling on boilers 121-124.

When the switch to non-condensing boilers occurs because outdoor air temperature has dropped below the switch point, all of the real-time heating load will be assigned to non-condensing boilers 121 and 122. Once a non-condensing boiler has been enabled or fired as described above and the return water temperature is equal to or greater than a user defined limit (e.g., 130° F.), any condensing boilers (e.g., boiler 123 or 124) that are enabled will be shut down, although their main pumps will continue to operate for a period of time that is calculated as a percentage of the boiler's just-concluded run time in order to extract additional heat from that boiler and reduce the effects of boiler precipitation on scaling of the boiler tubes. The total load will then be assigned to the running non-condensing boiler and the reset of the supply or output temperature will be defined by an equation having a slope which is designated for non-condensing boilers.

The inlet and outlet temperature difference, i.e., ΔT, is a user-defined value (e.g., 10° F.-45° F. or within the boiler manufacturer's limits) that can be selected via user interface device 190. This ΔT, measured by temperature sensors 144 and 145 for boiler 124, for example, is maintained to the extent possible via operation of controller 146 by providing control signals to the variable frequency drives of the boiler's respective pump, e.g., pump 137 in the above example. Pump 137, for example, will then be modulated or operated to increase or decrease water flow so as to maintain the measured ΔT with the user selected value. By modulating or controlling the flow rate of the boiler pumps, the pumps can put out less water at higher temperatures, thereby increasing boiler efficiency.

It can be seen from the previous explanation with reference to the drawings that system 120 provides microprocessor control of differing types of boilers in a heating system through the use of a variety of sensor inputs to optimally sequence and operate each boiler in the heating system to maximize efficiency of the boilers. The system is suitable for controlling multiple boilers of different sizes and of different types within the same heating system. By calculating real-time heating load and using that information to select and operate boilers, efficiency losses and detrimental effects on equipment life due to short-cycling of boilers are prevented or eliminated. The system disclosed herein effectively prevents non-condensing boilers from condensing while condensing boilers are allowed to condense. The system offers the ability to reset and control both condensing and non-condensing boilers on the same system. With two unique and user definable reset temperature slopes, both types of boilers can be utilized seamlessly.

The controllers shown in FIGS. 3-6 were described in the context of implementing a PID version of a process modulation algorithm of the present disclosure for purposes of controlling a hybrid boiler system. In practice, the process modulation algorithm is applicable to many types of systems including, but not limited to, systems employing devices using energy sources (e.g., natural gas, oil, coal, gasoline, steam, water, and electricity) for any purpose (e.g., heating, cooling, pumping, current output, and mechanical energy). To facilitate further understanding of the process modulation algorithm of the present disclosure in the context of any system and to introduce a rate-of-change modulation version of the process modulation algorithm, descriptions will now be provided herein of a flowchart 300 representative of the process modulation algorithm as shown in FIG. 8 and of a flowchart 400 representative of the rate-of-change modulation version of the process modulation algorithm as shown in FIG. 9.

Figure 8:
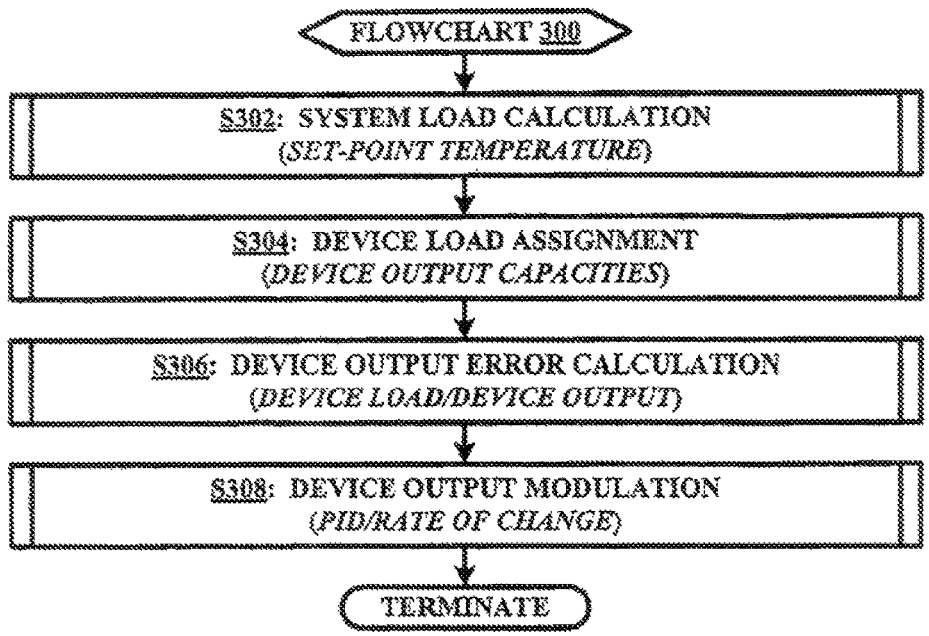
FIG. 8 is a flowchart representative of a process modulation algorithm in accordance with an embodiment of the present disclosure.
Figure 9:
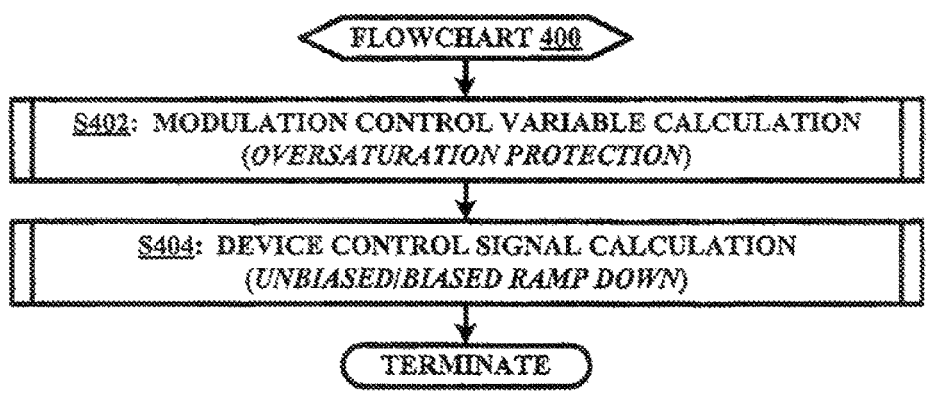
FIG. 9 is a flowchart representative of a rate-of-change modulation scheme in accordance with an embodiment of the present disclosure.

Referring to FIG. 8, a stage S302 of flowchart 300 encompasses a system energy load calculation that is dependent upon one or more operational conditions (e.g., temperature, pressure, power consumption, motion, etc.) of an applicable system (e.g., heating, cooling, pumping, current output, and mechanical energy). For example, in the context of a hybrid heating system including one or more condensing boilers and one or more non-condensing boilers, the following equations [1] and [2] can be utilized for purposes of calculating a system energy load for the hybrid heating system that is dependent upon a set-point temperature of the hybrid heating system:

$$L=((T_{SP}-T_R)+(T_{SP}-T_S))*(GPM*WLG*MPH) \quad [1]$$

$$L=((T_{SP}-T_R)+(T_{SP}-T_S)+(CTL-T_R))* \\ (GPM*WLG*MPH) \quad [2]$$

where (1) L is a calculated system energy load (BTU/H) for the hybrid heating system, (2) $T_{SP}$ is the set-point temperature (° F.) of the hybrid heating system, (3) $T_S$ is the supply water temperature (° F.) of the hybrid heating system, (4) $T_R$ is the return water temperature (° F.) of the hybrid heating system, (5) GPM is the number of gallons per minute flowing through the hybrid heating system past a flow sense point, (6) WLG is the pounds of water per gallon within the hybrid heating system, (7) MPH is the minutes per hour the hybrid heating system is expected to be operational for an hour time period, and (8) CTL is a condensing temperature limit (° F.) of the hybrid heating system.

Equation [1] is utilized for all condensing operations and for non-condensing operations whereby the return water temperature $T_R$ is equal to or greater than the condensing temperature limit CTL. Conversely, equation [2] is utilized for non-condensing operations whereby the return water temperature $T_R$ is less than the condensing temperature limit CTL. As previously described herein, a hybrid heating system can be switched between condensing operations and non-condensing operations based on a comparison of the outdoor air temperature to a switch temperature point whereby condensing operations primarily occur above the switch temperature point and non-condensing operations primarily occur below the switch temperature point.

A determination of the set-point temperature is also dependent upon whether the hybrid heating system is in condensing operations or non-condensing operations. For example, a condensing reset temperature slope is derived from a graph of a water temperature range and output air temperature range for the condensing boiler(s). For this slope, one endpoint is plotted as the maximum water temperature/minimum outdoor air temperature and the other endpoint is plotted as the minimum water temperature/maximum outdoor air temperature, whereby the set-point temperature is the water temperature on the slope corresponding to a sensed outdoor air temperature. Similarly, a non-condensing reset temperature slope is derived from a graph of a water temperature range and output air temperature range for the non-condensing boiler(s). Again, for this slope, one endpoint is plotted as the maximum water temperature/minimum outdoor air temperature and the other endpoint is plotted as the minimum water temperature/maximum outdoor air temperature whereby the set-point temperature is the water temperature on the slope corresponding to a sensed outdoor air temperature.

Still referring to FIG. 8, a stage S304 of flowchart 300 encompasses a device load assignment that is dependent upon the output capacities of the device(s) (e.g., boilers, chillers, pumps, dampers, etc.) of the applicable system (e.g., heating, cooling, pumping, current output and mechanical energy). For example, in the context of a hybrid heating system including one or more condensing boilers and one or more non-condensing boilers, the following equations [3] and [4] can be utilized for purposes of assigning a device load for each boiler Y of a total of X enabled boilers of the hybrid heating system:

$$BY_{IL} = (OY_{MAX}/\Sigma OX_{MAX}))*(L) \quad [3]$$

$$BY_{IL} = (OY_{MIN}/\Sigma OX_{MIN}))*(L) \quad [4]$$

where (1) $BY_{IL}$ is a load assignment (BTU/H) for a particular boiler Y, (2) $OY_{MAX}$ is the maximum output (BTU/H) for a particular boiler Y, (3) $\Sigma OX_{MAX}$ is a summation of all maximum outputs (BTU/H) for the enabled boilers X, (4) $OY_{MIN}$ is the minimum output (BTU/H) for a particular boiler Y, (5) $\Sigma OX_{MIN}$ is a summation of all minimum outputs (BTU/H) for the enabled boilers X, and (6) L is the previously calculated system energy load (BTU/H) for the hybrid heating system.

Equation [3] is utilized whenever all of the control signal(s) (e.g., analog or digital, voltage or current) of the enabled boiler(s) X are to be modulated as described herein. Conversely, equation [4] is utilized whenever less than all of the control signal(s) (e.g., analog or digital, voltage or current) of the enabled boiler(s) X are to be modulated as described herein. As previously described herein, the determination of which boiler(s) to enable at any given moment is a function of the operational state of the system (i.e., condensing or non-condensing) as well as the operational state of each boiler in terms of at least an online/offline status of the boiler, and an operational time status of the boiler.

Stages S302 and S304 are initially executed prior to the conclusion of the low fire time delay of the hybrid heating system and thereafter are continually executed on a periodic basis to maintain a dynamic efficient control of the hybrid heating system.

Still referring to FIG. 8, a stage S306 of flowchart 300 encompasses a device output error calculation that is based on a comparison of an assigned device load and a device output for each enabled device (e.g., boiler, chiller, pump, damper, etc.) of the applicable system (e.g., heating, cooling, pumping, current output and mechanical energy). For example, in the context of a hybrid heating system including one or more condensing boilers and one or more non-condensing boilers, the following equations [5]-[10] can be utilized for purposes of calculating a device output error for each enabled boiler of the hybrid heating system:

$$BY_{SP} \approx BY_{IL} \quad [5]$$

$$BY_{HL} = OY_{MAX} + DB \quad [6]$$

$$BY_{LL} = OY_{MIN} - DB \quad [7]$$

$$DB = OF*(OY_{MAX}/100) \quad [8]$$

$$O_{BY} = (V_{CON} - V_{MIN})*((OY_{MAX} - OY_{MIN})/(V_{MAX} - V_{MIN})) + OY_{MIN} \quad [9]$$

$$E_Y = BY_{SP} - O_{BY} \quad [10]$$

where (1) $BY_{SP}$ is the boiler output set-point temperature (BTU/H) for a particular boiler Y, (2) $BY_{IL}$ is the previously calculated load assignment (BTU/H) for a particular boiler Y, (3) $BY_{HL}$ is a high limit for the boiler output set-point temperature $BY_{SP}$, (4) $BY_{LL}$ is a low limit for the boiler output set-point temperature $BY_{SP}$, (5) $OY_{MAX}$ is the maximum output (BTU/H) for a particular boiler Y, (6) $OY_{MIN}$ is the minimum output (BTU/H) for a particular boiler Y, (7) DB is a deadband based on an output percentage factor OPF of a particular boiler Y, whereby the output percentage factor OPF can be designed to range from 1 to 100, (8) $O_{BY}$ is a calculated heat output (BTU/H) for a particular boiler Y, (9) $V_{CON}$ is an analog control voltage signal for a particular boiler Y that controls the fire level of that boiler Y,

(10) $V_{MAX}$ is a maximum of the analog control voltage signal $V_{CON}$ (e.g., 10 volts),

(11) $V_{MIN}$ is a minimum of the analog control voltage signal $V_{CON}$ (e.g., 0 volts), and

(12) $E_Y$ is the calculated error for a particular boiler Y.

While equations [5]-[10] can be executed during the low fire time delay of the hybrid heating system, it is only of particular interest for equations [5]-[8] to be executed or processed during the low fire time delay and all of the equations [5]-[10] to be executed continually on a periodic basis upon completion of the low fire time delay.

Also note that the boiler output set-point temperature $BY_{SP}$ is a function of the calculated load assignment $BY_{IL}$ that can dynamically vary between the low limit $BY_{LL}$ and the high limit $BY_{HL}$. As such, those having ordinary skill in the art will appreciate the purpose of utilizing the deadband DB to establish the low limit $BY_{LL}$ and the high limit $BY_{HL}$ is to limit the dynamic variable nature of the calculated load assignment $BY_{IL}$. For a hybrid heating system, the output percentage factor OPF is preferably 1 for stage S306.

Furthermore, during the low fire period, it is best to ramp the analog control voltage signal $V_{CON}$ at a fixed rate in the appropriate up or down direction based on the calculated error $E_Y$ in an attempt to reach the boiler output set-point temperature $BY_{SP}$ during the low fire period in a controlled manner. Thereafter, the control voltage signal $V_{CON}$ is modulated in the appropriate positive or negative direction based on the calculated error $E_Y$ in accordance with stage S308 of flowchart 300.

Specifically, stage S308 encompasses a modulation of an output of a device (e.g., boiler, chiller, pump, damper, etc.) based on the calculated device output error in accordance with a modulation scheme chosen for an applicable system (e.g., heating, cooling, pumping, current output and mechanical energy). For example, in the context of a hybrid heating system including one or more condensing boilers and one or more non-condensing boilers, a modulation of an output of an enabled boiler based on a calculated device output error of that enabled boiler may be in accordance with the PID modulation scheme previously described herein. In another exemplary embodiment, the chosen modulation scheme is a rate-of-change modulation scheme as represented by the flowchart 400 shown in FIG. 9.

Referring to FIG. 9, a stage S402 of flowchart 400 encompasses a calculation of a modulation control variable. For example, in the context of a hybrid heating system including one or more condensing boilers and one or more non-condensing boilers, the following equations [11]-[17] can be utilized for purposes of calculating the modulation control variable:

$$\text{IF } E_Y \uparrow \text{ and } E_Y > +DB, \text{ THEN } CV_Y = CV_Y + 2 \quad [11]$$

$$\text{IF } E_Y \uparrow \text{ and } E_Y < -DB, \text{ THEN } CV_Y = CV_Y - 2 \quad [12]$$

$$\text{IF } E_Y \downarrow \text{ and } E_Y > +DB, \text{ THEN } CV_Y = CV_Y + 1 \quad [13]$$

$$\text{IF } E_Y \downarrow \text{ and } E_Y < -DB, \text{ THEN } CV_Y = CV_Y - 1 \quad [14]$$

$$\text{IF } E_Y < DB \text{ and } E_Y > -DB, \text{ THEN } CV_Y = CV_Y + 0 \quad [15]$$

$$CV_{LL} = (ADCF) * V_{MIN} \quad [16]$$

$$CV_{HL} = (ADCF) * V_{MAX} \quad [17]$$

where (1) $CV_Y$ is the modulation control variable for a particular boiler Y that varies between a low limit $CV_{LL}$ and a high limit $CV_{HL}$ (initially equal to low limit $CV_{LL}$ upon the enablement of the boiler), (2) $E_Y$ is the calculated error for a particular boiler Y, and (3) ADCF is an analog-to-digital conversion factor corresponding to a number of bit states of a digital analog voltage signal $AN_Y$ divided by the maximum voltage $V_{MAX}$ for the analog control voltage signal $V_{CON}$.

Again, those having ordinary skill in the art will appreciate that the purpose of utilizing the deadband DB to control the calculation for the modulation control variable $CV_Y$ is to limit the dynamic variable nature of the calculated error $E_Y$, which is a function of the dynamic variable nature of calculated load assignment $BY_{ZL}$. For a hybrid heating system, the output percentage factor OPF is preferably 1 for stage S402.

Furthermore, the following equation [18] can be utilized to prevent an oversaturation of the modulation control variable $CV_Y$:

$$\text{IF } E_Y < DB, \text{ THEN } CV_Y = AN_Y \quad [18]$$

where $AN_Y$ is the digital conversion of the analog control voltage signal $V_{CON}$ that will be further explained subsequently herein. Preferably, the output percentage factor OPF for deadband DB is 50 for the oversaturation protection of the modulation control variable $CV_Y$.

A stage S404 of flowchart 400 encompasses a calculation of a control signal for each enable device (e.g., boiler, chiller, pump, damper, etc.) of the applicable system (e.g., heating, cooling, pumping, current output, and mechanical energy) as a function of the previously calculated modulation control variable $CV_Y$. For example, in the context of a hybrid heating system including one or more condensing boilers and one or more non-condensing boilers, the following equations [19]-[21] can be utilized for purposes of calculating an unbiased digital control voltage signal $AN_Y$ of Z bits (e.g., 12 bits):

$$\text{IF } CV_Y > AN_Y, \text{ THEN } AN_Y = AN_Y + 1 \quad [19]$$

$$\text{IF } CV_Y < AN_Y, \text{ THEN } AN_Y = AN_Y - 1 \quad [20]$$

$$\text{IF } CV_Y = AN_Y, \text{ THEN } AN_Y = AN_Y - 0 \quad [21]$$

The following equations [22]-[27] can be utilized for purposes of calculating a biased ramp down of digital control voltage signal $AN_Y$ of Z bits (e.g., 12 bits):

$$R_{PG1} = (V_G * 10 * B_E)/(OY_{MAX}/1000)/10 \quad [22]$$

$$R_{PG2} = 2R_{PG1} \quad [23]$$

$$\text{IF } CV_Y > AN_Y, \text{ THEN } AN_Y = AN_Y + 1 \quad [24]$$

$$\text{IF } CV_Y < AN_Y \text{ AND } E_Y < -DB, \text{ THEN } AN_Y = AN_Y - R_{PG1} \quad [25]$$

$$\text{IF } CV_Y < AN_Y \text{ AND } E_Y > -DB, \text{ THEN } AN_Y = AN_Y - R_{PG2} \quad [26]$$

$$\text{IF } CV_Y = AN_Y, \text{ THEN } AN_Y = AN_Y - 0 \quad [27]$$

where (1) $R_{PG1}$ is the base-biased ramp-down variable for a particular boiler Y, (2) $V_G$ is the water volume of a particular boiler Y in gallons, (3) $B_E$ is a maximum rated efficiency of a particular boiler Y, (4) $OY_{MAX}$ is the maximum output (BTU/H) for a particular boiler Y, and (5) $R_{PG2}$ is the amplified-biased ramp-down variable for a particular boiler Y.

Preferably, the output percentage factor OPF for deadband DB is 5 for the biased ramp-down of digital control voltage signal $AN_Y$.

To modulate the rate-of-change of the unbiased or biased ramp-down of digital control voltage signal $AN_Y$, the following equation [28] can be utilized to control a timer gate that counts up to allow a calculation of digital control voltage signal $AN_Y$ and is thereafter reset to begin a new count up sequence for the next calculation of digital control voltage signal $AN_Y$:

$$\text{IF } E_Y < +DB \text{ and } E_Y > -DB, \text{ THEN } TGPV_Y = PA * TGF \quad [28]$$

where (1) $TPGV_Y$ is a timer gate preset value, (2) PA is a process acceleration scale value, and (3) TGF is a time gate factor inversely correlated to a chosen output percentage factor OPF for deadband DB.

The inverse correlation of the timer gate factor TGF and the output percentage factor OPF is a function of the timing specification of the timer gate and one or more designed output percentage factors OPF for deadband DB. For example, the following table illustrates an inverse correlation designed output percentage factors to a timer gate factor TGF in terms of the number times per second the timer gate should allow for a calculation of the digital control voltage signal $AN_Y$:

| OUTPUT PERCENTAGE FACTOR OPF | TIMER GATE FACTOR TGF |
|---|---|
| 1 | 8 (10 times/8 seconds) |
| 2 | 7 (10 times/7 seconds) |
| 5 | 6 (10 times/6 seconds) |
| 10 | 5 (10 times/5 seconds) |
| 20 | 4 (10 times/4 seconds) |
| 30 | 3 (10 times/3 seconds) |

-continued

| OUTPUT PERCENTAGE FACTOR OPF | TIMER GATE FACTOR TGF |
|---|---|
| 40 | 2 (10 times/2 seconds) |
| 50 | 1 (10 times/1 seconds) |

A benefit of equation [28] is as the calculated error $E_Y$ of stage S306 decreases, the rate of change of the modulation of the digital control voltage signal $AN_Y$ is decelerated in view of a corresponding increase in the timer gate preset value $TPGV_Y$. Conversely, as the calculated error $E_Y$ of stage S306 increases, the rate of change of the modulation of the digital control voltage signal $AN_Y$ is accelerated in view of a corresponding decrease in the timer gate preset value $TPGV_Y$.

Please note flowchart 400 is designed to execute digital calculations of the modulation control variable and digital control voltage signal and thus the requirement for equations [16] and [17]. Those having ordinary skill in the art will appreciate that, in order to drive an analog circuit of a boiler, the digital control voltage signal has to be converted back into the analog control voltage signal.

Figure 10:
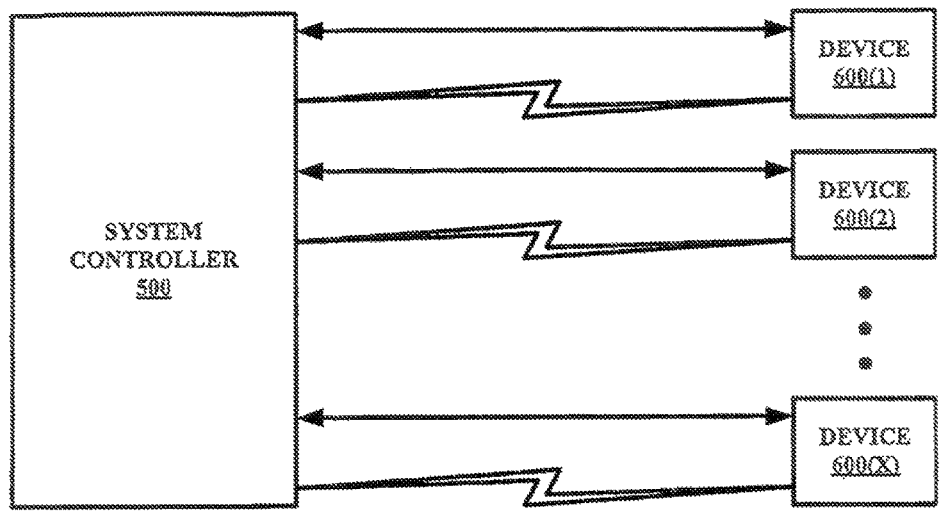
FIG. 10 is a schematic and block diagram of a single system controller for a plurality of devices constructed in accordance with an embodiment of the present disclosure.
Figure 11:
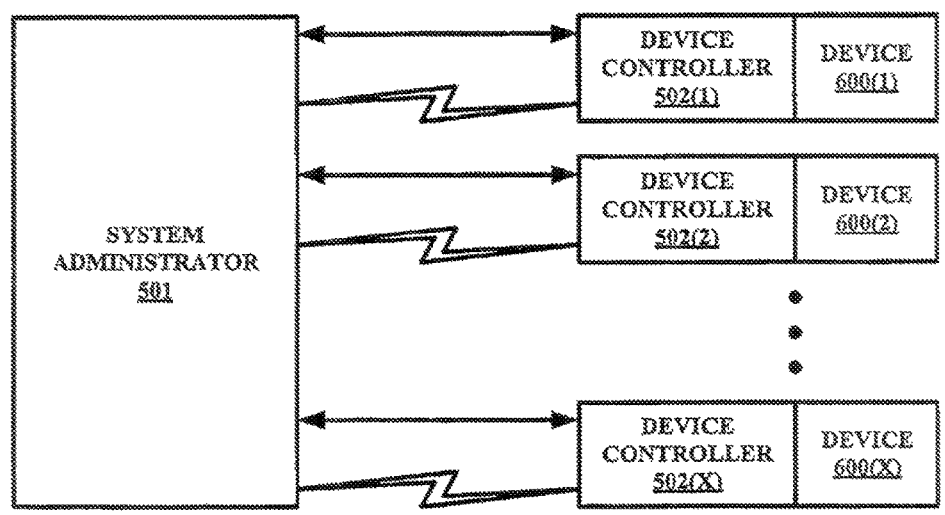
FIG. 11 is a schematic and block diagram of a system administrator and corresponding device controllers for a plurality of devices constructed in accordance with an embodiment of the present disclosure.

Referring to FIGS. 8 and 9, those having ordinary skill in the art will appreciate the benefits of the process modulation algorithm and various modulation schemes of the present disclosure. Those having ordinary skill in the art of the present disclosure will further appreciate how to apply equations [1]-[28] to various systems, in particular how to design the various variables of equations [1]-[28] in view of the particular type of devices to be controlled in accordance with the present disclosure. For example, FIG. 10 illustrates a system controller 500 for implementing flowcharts 300 (FIG. 8) and 400 (FIG. 9) via a wireline or wireless network with a number X of devices 600 of any type (e.g., boilers, chillers, pumps, dampers, etc.). By further example, FIG. 11 illustrates a system administrator 501 for executing stages S302 and S304 of flowchart 300 (FIG. 8) via a wireline or wireless network to device controllers 502 for executing stages S306 and S308 of flowchart 300 as well as flowchart 400 (FIG. 9) on behalf of devices 600 (e.g., boilers, chillers, pumps, dampers, etc.). Alternatively, administrator 501 can partially or entirely execute stage S306.

Figure 12:
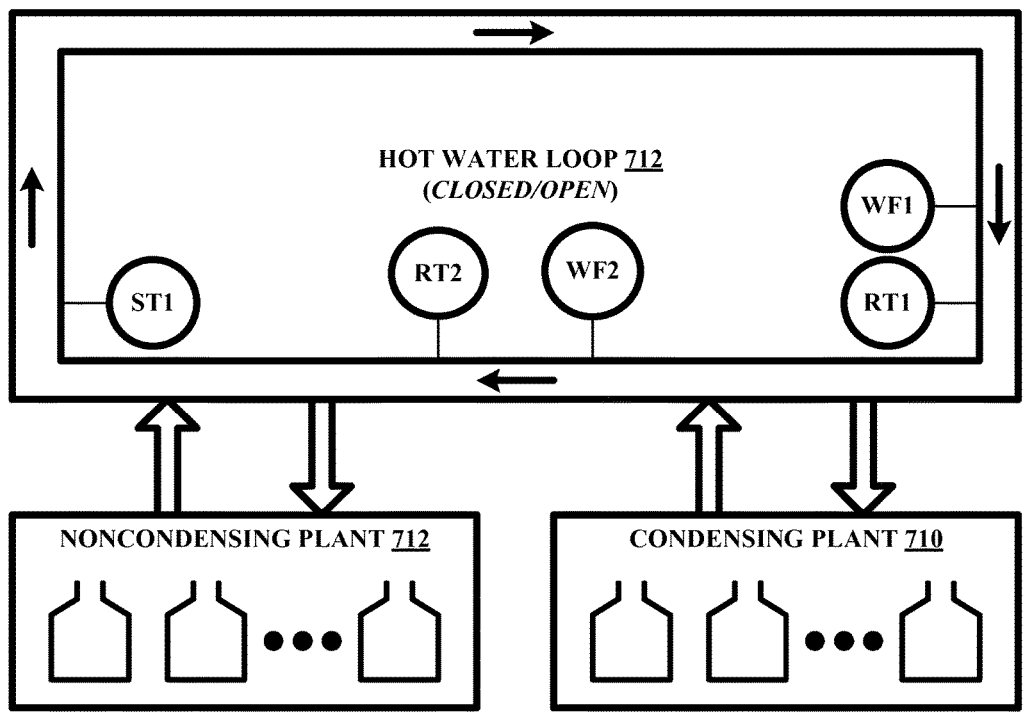
FIG. 12 is a schematic and block diagram of an exemplary embodiment a hybrid heating system of the present disclosure illustrating a condensing plant and a non-condensing plant.

FIG. 12 illustrates a condensing plant 710 employing one or more condensing boilers, a non-condensing plant 711 employing one or more non-condensing boilers and a hot water loop 712 employing a piping system coupled to inlets and outlets of condensing plant 710 and non-condensing plant 711. Water flow through hot water loop 712 is designed to pass by or through condensing plant 710 prior to non-condensing plant 711 as shown in FIG. 12. Also shown are a condensing water flow meter WF1, a condensing return temperature sensor RT1, a non-condensing water flow meter WF2, a non-condensing return temperature sensor RT2, and a system supply temperature system ST1.

In practice for multiple condensing boiler embodiments, condensing plant 710 may have the condensing boilers in any serial, parallel or combination arrangement relative to hot water loop 712. Similarly, in practice for multiple non-condensing boiler embodiments, non-condensing plant 711 may have the non-condensing boilers in any serial, parallel or combination arrangement relative to hot water loop 712.

Figure 13:
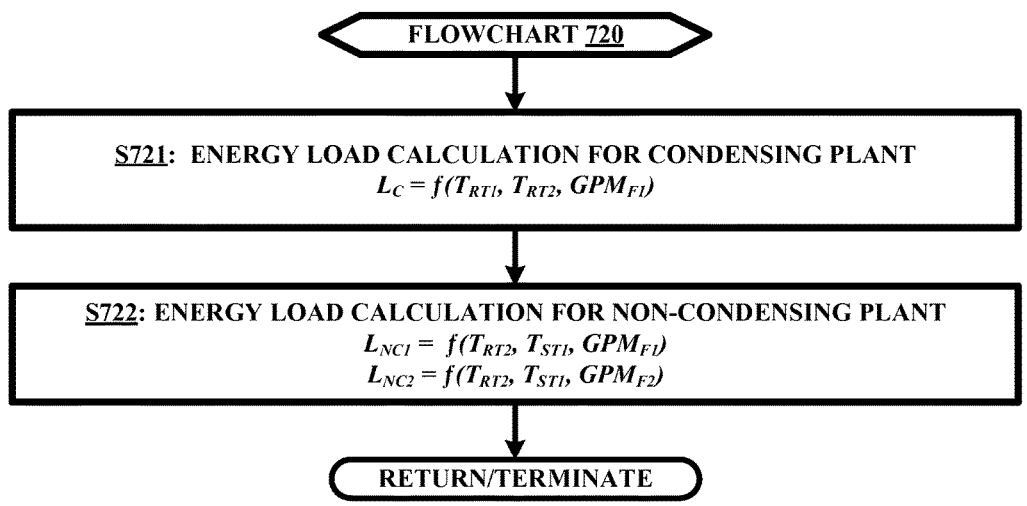
FIG. 13 is a flowchart representative of an exemplary embodiment of hybrid energy load calculation method of the present disclosure.

Referring to FIG. 13, flowchart 720 is representative of a hybrid energy load calculation of the present disclosure.

Specifically, a stage S721 of flowchart 720 encompasses an energy load calculation that is dependent upon one or more operational conditions (e.g., temperature, pressure, power consumption, motion, etc.) of condensing plant 710. Generally, the following equation [29] serves as a basis for purposes of calculating an energy load for condensing plant 710:

$$L_C = f(T_{RT1}, T_{RT2}, GPM_{WF1}) \quad [29]$$

where $L_C$ is a calculated energy load (BTU/H) for condensing plant 710, $T_{RT1}$ is the return temperature (° F.) sensed by condensing return temperature sensor RT1, $T_{RT2}$ is the return temperature (° F.) sensed by non-condensing return temperature sensor RT2, and $GPM_{WF1}$ is the number of gallons per minute flowing through hot water loop 7712 past water flow meter WF1.

In one embodiment of stage S721 dependent upon a set-point temperature of condensing plant 710, the following equation [30] may be utilized for purposes of calculating an energy load for condensing plant 710:

$$L_C = ((T_{SPC} - T_{RT1}) + (T_{SPC} - T_{RT2}))^* (GPM_{WF1} * WLG * MPH_C) \quad [30]$$

where $T_{SPC}$ is the condensing set-point temperature (° F.) of condensing plant 710, WLG is the pounds of water per gallon within hot water loop 712, and $MPH_C$ is the minutes per hour condensing plant 710 is expected to be operational for an hour time period.

In one embodiment of stage S721 for condensing set-point temperature $T_{SPC}$, a condensing reset temperature slope is derived from a graph of a water temperature range and output air temperature range for condensing plant 710. For this slope, one endpoint is plotted as the maximum water temperature/minimum outdoor air temperature and the other endpoint is plotted as the minimum water temperature/maximum outdoor air temperature, whereby condensing set-point temperature $T_{SPC}$ is the water temperature on the slope corresponding to a sensed outdoor air temperature.

Upon completion of stage S721 of flowchart 720, device load assignment(s), device output error calculation(s) and device output modulation control may be implemented for condensing plant 710.

Still referring to FIG. 13, stage S722 of flowchart 720 encompasses an energy load calculation that is dependent upon one or more operational conditions (e.g., temperature, pressure, power consumption, motion, etc.) of non-condensing plant 711. Generally, the following equation [31] or equation [32] may serve as a basis for purposes of calculating an energy load for non-condensing plant 711:

$$L_{NC1} = f(T_{RT2}, T_{ST1}, GPM_{WF1}) \quad [31]$$

$$L_{NC2} = f(T_{RT2}, T_{ST1}, GPM_{WF2}) \quad [32]$$

where $L_{NC}$ is a calculated load (BTU/H) for non-condensing plant 711, $T_{RT2}$ is the return temperature (° F.) sensed by non-condensing return temperature sensor RT2, $R_{ST1}$ is the supply temperature (° F.) sensed by system supply temperature sensor ST1, $GPM_{WF1}$ is the number of gallons per minute flowing through hot water loop 712 past water flow meter WF1, and $GPM_{WF2}$ is the number of gallons per minute flowing through hot water loop 712 past water flow meter WF2.

In one embodiment of stage S722 dependent upon a set-point temperature of non-condensing plant 711, the following equation [33] or equation [34] may be utilized for purposes of calculating an energy load for non-condensing plant 711:

$$L_{NC1} = ((T_{SPN} - T_{RT2}) + (T_{SPN} - T_{ST1})) * (GPM_{WF1} * WLG * MPH_{NC}) \quad [33]$$

$$L_{NC2} = ((T_{SPN} - T_{RT2}) + (T_{SPN} - T_{ST1})) * (GPM_{WF2} * WLG * MPH_{NC}) \quad [34]$$

wherein $T_{SPN}$ is the set-point temperature (° F.) of non-condensing plant 711, WLG is the pounds of water per gallon within hot water loop 712, and $MPH_{NC}$ is the minutes per hour non-condensing plant 711 is expected to be operational for an hour time period.

Alternatively, equations [33] and [34] may be modified as follows to address a return temperature less than a condensing temperature limit CLT:

$$L_{NC1} = ((T_{SPN} - T_{RT2}) + (T_{SPN} - T_{ST1}) + (CLT - T_{RT2})) * (GPM_{WF1} * WLG * MPH_{NC}) \quad [35]$$

$$L_{NC2} = ((T_{SPN} - T_{RT2}) + (T_{SPN} - T_{ST1}) + (CLT - T_{RT2})) * (GPM_{WF2} * WLG * MPH_{NC}) \quad [36]$$

In one embodiment of stage S722 for set-point temperature $T_{SPN}$, a non-condensing reset temperature slope is derived from a graph of a water temperature range and output air temperature range for non-condensing plant 711. For this slope, one endpoint is plotted as the maximum water temperature/minimum outdoor air temperature and the other endpoint is plotted as the minimum water temperature/maximum outdoor air temperature whereby set-point temperature $T_{SPN}$ is the water temperature on the slope corresponding to a sensed outdoor air temperature.

Upon completion of stage S722 of flowchart 720, device load assignment(s), device output error calculation(s), and device output modulation control may be implemented for non-condensing plant 711.

Figure 14A:
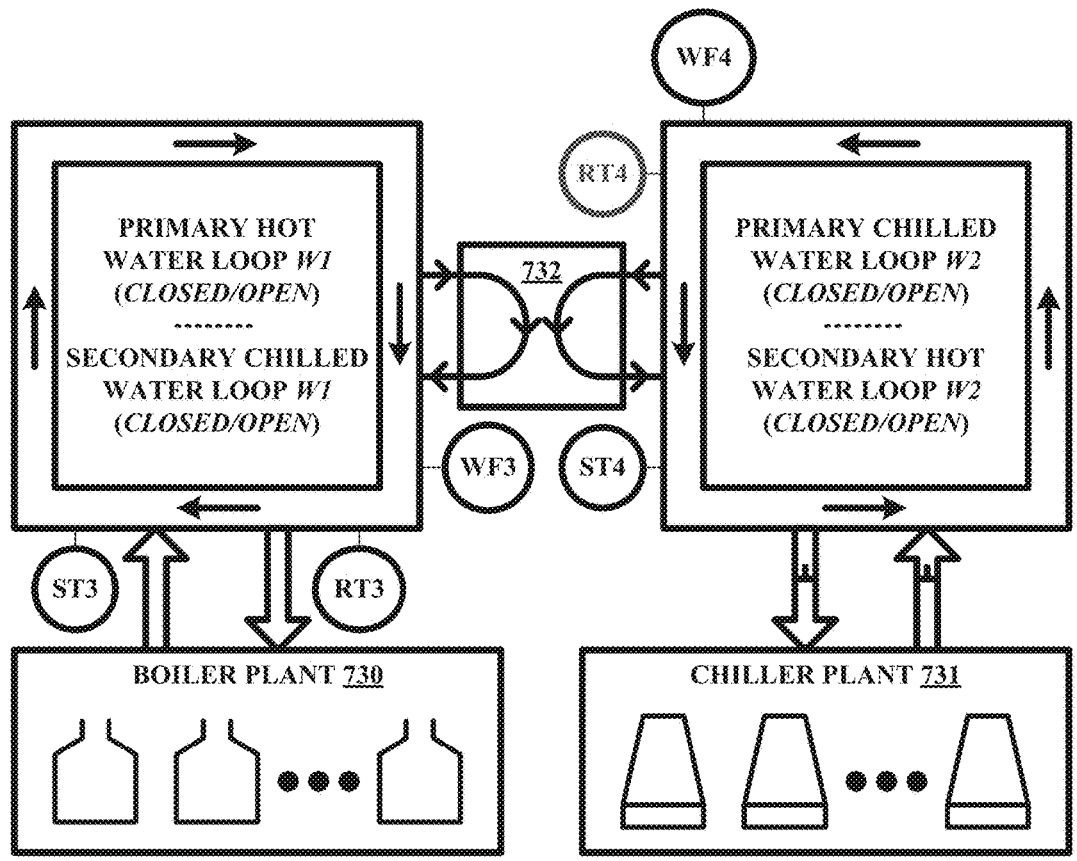
FIGS. 14A and 14B are schematic and block diagrams of an exemplary embodiment an energy exchange system of the present disclosure illustrating a boiler pipe system and a chiller pipe system.
Figure 14B:
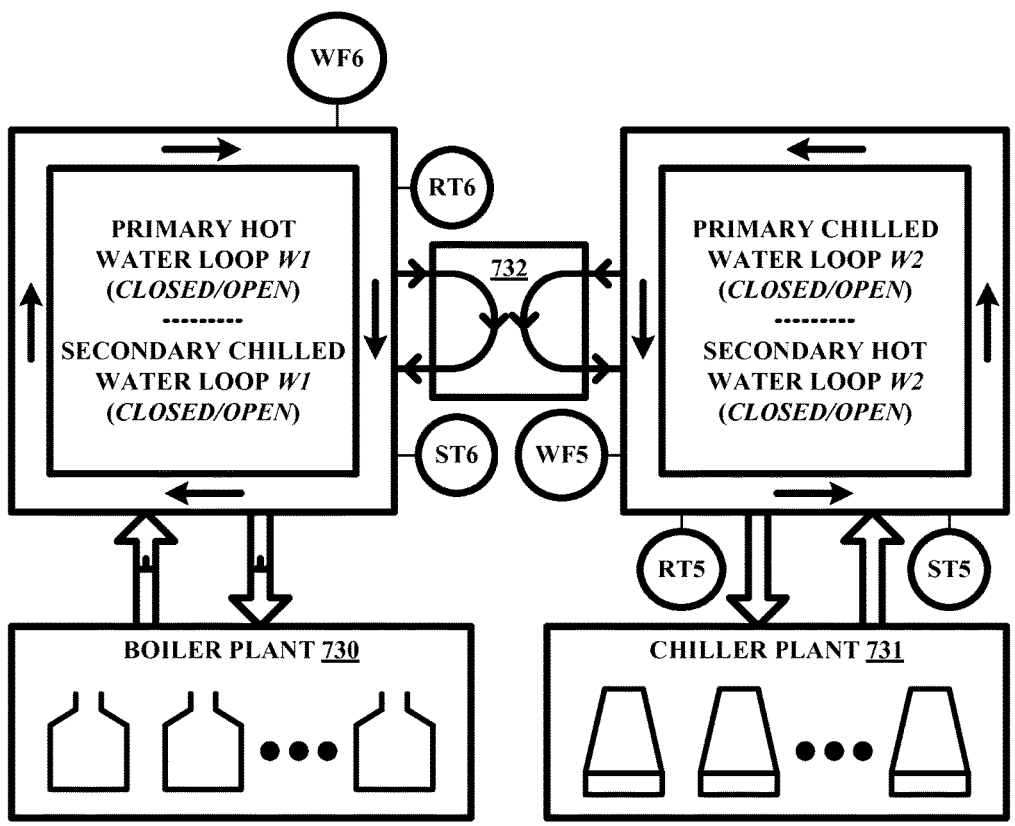

FIGS. 14A and 14B illustrate an energy exchange system employing a boiler plant 730 including one or more boilers of any type, a chiller plant 731 including one or more chillers of any type, a primary hot water loop W1 employing a piping system coupled to inlets and outlets of boiler plant 730, a primary chilled water loop W2 employing a piping system coupled to inlets and outlets of chiller plant 731 and an energy exchanger 732 for transferring thermal energy between primary hot water loop W1 and primary chilled water loop W2.

Figure 15A:
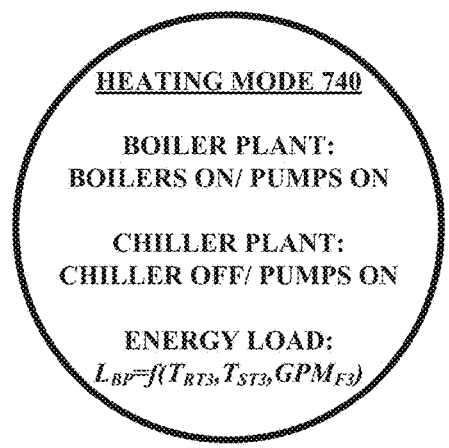
FIGS. 15A and 15B are state diagrams of an exemplary operation of the energy exchange system illustrated in FIGS. 14A and 14B.

In operation for a heating mode 740 as shown in FIG. 15A, boiler(s) of boiler plant 730 are operational with pumps of boiler plant 730 (not shown) facilitating a flow of heated water through primary hot water loop W1. Concurrently, chiller(s) of chiller plant 731 are inoperative and valved off from primary chilled water loop W2 while pumps (not shown) of chiller plant 731 (not shown) facilitate a flow of water through primary chilled water loop W2. In this scheme, energy exchanger 732 transfers thermal energy from primary hot water loop W1 to primary chilled water loop W2, which now serves as a secondary hot water loop W2.

An energy load calculation for heating mode 740 is dependent upon one or more operational conditions (e.g., temperature, pressure, power consumption, motion, etc.) of boiler plant 730 and chiller plant 731. Generally, the following equation [35] or equation [36] may serve as a basis for purposes of calculating an energy load for boiler plant 730:

$$L_{BP1} = f(T_{RT3}, T_{ST3}, GPM_{WF3}) \quad [35]$$

$$L_{BP2} = f(T_{RT3}, T_{ST3}, GPM_{WF3}, T_{RT4}, T_{ST4}, GPM_{WF4}) \quad [36]$$

where $L_{BP}$ is a calculated energy load (BTU/H) for boiler plant 730, $T_{RT3}$ is the return temperature (° F.) sensed by return temperature sensor RT3, $T_{ST3}$ is the supply temperature (° F.) sensed by system supply temperature sensor ST3, $GPM_{WF3}$ is the number of gallons per minute flowing through primary hot water loop W1 past water flow meter WF3, $T_{RT4}$ is the return temperature (° F.) sensed by return temperature sensor RT4, $T_{ST4}$ is the supply temperature (° F.) sensed by system supply temperature sensor ST4, and $GPM_{WF4}$ is the number of gallons per minute flowing through secondary hot water loop W2 past water flow meter WF4.

In one embodiment of heating mode 740 dependent upon a set-point temperature of boiler plant 730, the following equations [37] and/or [38] may be utilized for purposes of calculating an energy load for boiler plant 730:

$$L_{BP1} = ((T_{SPB} - T_{RT3}) + (T_{SP3} - T_{ST3})) * (GPM_{WF3} * WLG_{BP} * MPH_{BP}) \quad [37]$$

$$L_{BP2} = ((T_{SPB} - T_{RT4}) + (T_{SP4} - T_{ST4})) * (GPM_{WF4} * WLG_{CP} * MPH_{CP}) \quad [38]$$

wherein $T_{SPB}$ is the set-point temperature (° F.) of boiler plant 730, $WLG_{BP}$ is the pounds of water per gallon within boiler plant 730, $WLG_{CP}$ is the pounds of water per gallon within chiller plant 731, $MPH_{BP}$ is the minutes per hour boiler plant 730 is expected to be operational for an hour time period, and $MPH_{CP}$ is the minutes per hour the pumps of chiller plant 731 is expected to be operational for an hour time period.

In practice, equation [37] will always be utilized for purposes of calculating the energy load for boiler plant 730, while equation [38] may or may not be utilized for purposes of calculating the energy load for boiler plant 730. For example, equation [37] may be utilized exclusively, equations [37] and [38] may be added equally or weighted in favor of equation [37], or equations [37] and [38] may be averaged equally or weighted in favor of equation [37].

In one embodiment using set-point temperature $T_{SPB}$, a reset temperature slope is derived from a graph of a water temperature range and output air temperature range for boiler plant 730. For this slope, one endpoint is plotted as the maximum water temperature/minimum outdoor air temperature and the other endpoint is plotted as the minimum water temperature/maximum outdoor air temperature whereby condensing set-point temperature $T_{SPB}$ is the water temperature on the slope corresponding to a sensed outdoor air temperature.

Figure 15B:
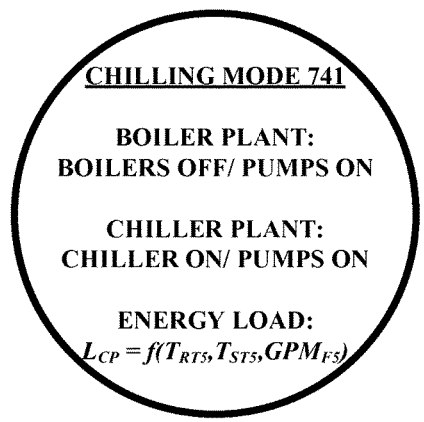

In operation for a chilling mode 741 as shown in FIG. 15B, chillers of chiller plant 731 are operational with pumps of chiller plant 731 (not shown) facilitating a flow of chilled water through primary chilled water loop W2. Concurrently, boiler(s) of boiler plant 730 are inoperative and valved off from primary hot water loop W1, while pumps of boiler plant 730 (not shown) facilitate a flow of water through primary hot water loop W1. In this scheme, energy exchanger 732 transfer thermal energy to primary chilled water loop W2 from primary hot water loop W1, which now serves as a secondary chilled water loop W1.

An energy load calculation for chilling mode 741 is dependent upon one or more operational conditions (e.g., temperature, pressure, power consumption, motion, etc.) of boiler plant 730 and chiller plant 731. Generally, the following equation [39] or equation [40] may serve as a basis for purposes of calculating an energy load for chiller plant 731:

$$L_{CP1} = f(T_{RT5}, T_{ST5}, GPM_{WF5})  \quad [39]$$

$$L_{CP2} = f(T_{RT5}, T_{ST5}, GPM_{WF5}, T_{RT6}, T_{ST6}, GPM_{WF6}) \quad [40]$$

where $L_{CP}$ is a calculated energy load (BTU/H) for chiller plant 731, $T_{RT5}$ is the return temperature (° F.) sensed by return temperature sensor RT5, $T_{ST5}$ is the supply temperature (° F.) sensed by system supply temperature sensor ST5, $GPM_{WF5}$ is the number of gallons per minute flowing through primary chilled water loop W2 past water flow meter WF5, $T_{RT6}$ is the return temperature (° F.) sensed by return temperature sensor RT6, $T_{ST6}$ is the supply temperature (° F.) sensed by system supply temperature sensor ST6, and $GPM_{WF6}$ is the number of gallons per minute flowing through secondary chilled water loop W1 past water flow meter WF6.

In one embodiment of chilling mode 741 dependent upon a set-point temperature of chiller plant 731, the following equations [41] and/or [42] may be utilized for purposes of calculating an energy load for chiller plant 731:

$$L_{CP1} = ((T_{SPC} - T_{RT5}) + (T_{SP3} - T_{ST5}))^* (GPM_{WF5} * WLG_{CP} * MPH_{CP})^*(-1) \quad [41]$$

$$L_{CP2} = ((T_{SPC} - T_{RT6}) + (T_{SP4} - T_{ST6}))^* (GPM_{WF6} * WLG_{BP} * MPH_{BP})^*(-1) \quad [42]$$

wherein $T_{SPC}$ is the set-point temperature (° F.) of chiller plant 731, $WLG_{CP}$ is the pounds of water per gallon within chiller plant 731, $WLG_{BP}$ is the pounds of water per gallon within boiler plant 730

$MPH_{CP}$ is the minutes per hour chiller plant 731 is expected to be operational for an hour time period, and $MPH_{BP}$ is the minutes per hour the pumps of boiler plant 730 is expected to be operational for an hour time period.

In practice, equation [41] will always be utilized for purposes of calculating the energy load for chiller plant 731 while equation [42] may or may not be utilized for purposes of calculating the energy load for chiller plant 731. For example, equation [41] may be utilized exclusively, equations [41] and [42] may be added equally or weighted in favor of equation [41], or equations [41] and [42] may be averaged equally or weighted in favor of equation [41].

In one embodiment of set-point temperature $T_{SPC}$, a reset temperature slope is derived from a graph of a water temperature range and output air temperature range for chiller plant 731. For this slope, one endpoint is plotted as the maximum water temperature/minimum outdoor air temperature and the other endpoint is plotted as the minimum water temperature/maximum outdoor air temperature whereby condensing set-point temperature $T_{SPC}$ is the water temperature on the slope corresponding to a sensed outdoor air temperature.

Figure 16:
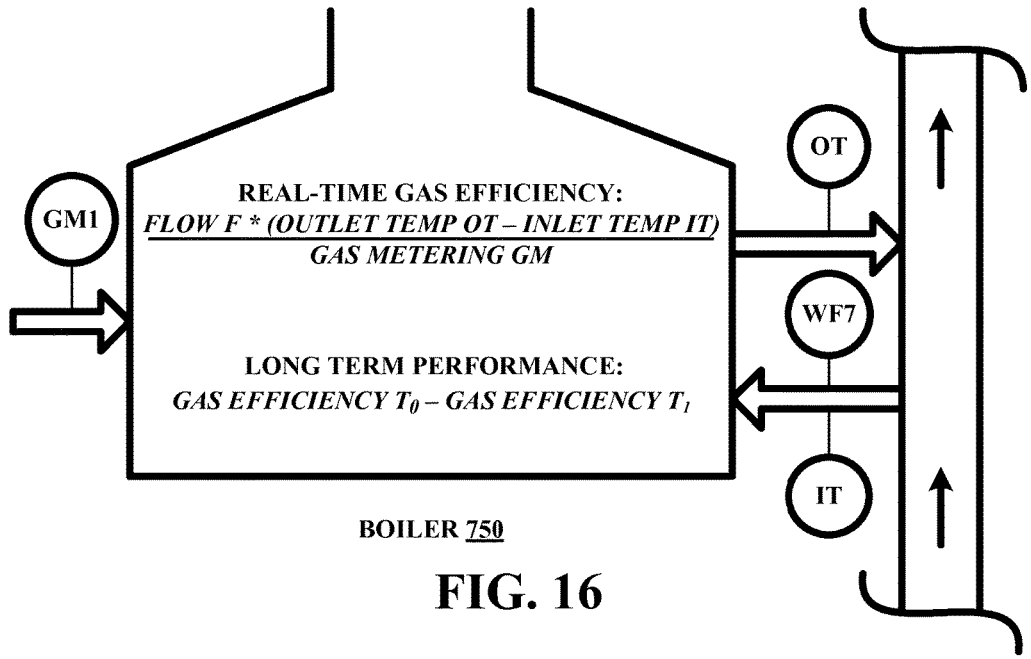
FIG. 16 is a schematic and block diagram of an exemplary embodiment of a gas efficiency boiler of the present disclosure.

FIG. 16 illustrates a boiler 750 having an inlet and an outlet connected to a piping system. Also shown are a gas meter GM1, an inlet temperature sensor IT, an outlet temperature sensor OT, and a water flow meter WF7. A real-time gas efficiency GF of boiler 750 is calculated in accordance with the following equation [43].

$$GF_{50} = (GPM_{WF7} * (T_{OT} - T_{IT}))/GAS_{GM1} \quad [43]$$

where $GF_{50}$ is a calculated gas efficiency for boiler 750, $T_{IT}$ is the inlet temperature (° F.) sensed by inlet temperature sensor IT, $T_{OT}$ is the outlet temperature (° F.) sensed by outlet temperature sensor OT, $GPM_{WF7}$ is the number of gallons per minute flowing through boiler 750 past water flow meter WF7, and $GAS_{GM1}$ is the amount of gas flowing into boiler 750 past gas meter GM1.

This will enable a tracking of long term performance of boiler 750 over the course of a time period $T_0$ to $T_1$.

Figure 17:
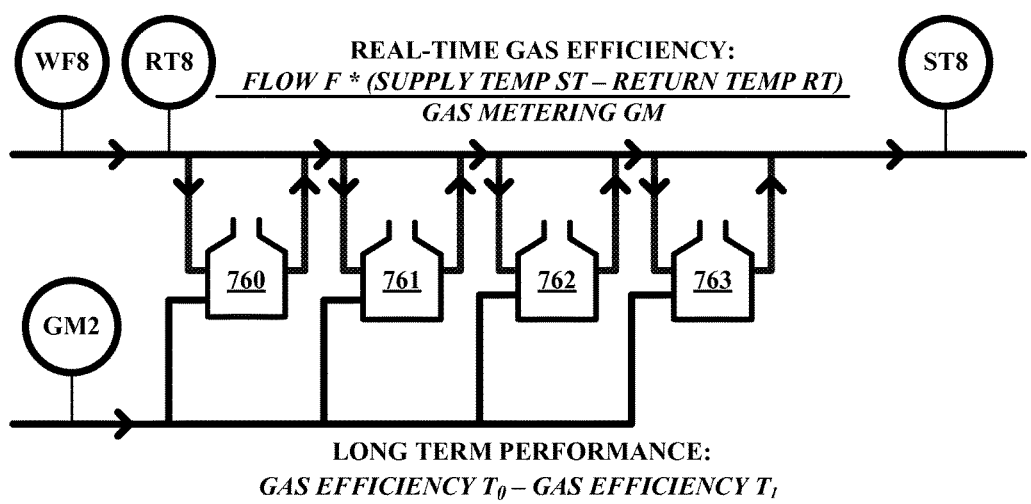
FIG. 17 is a schematic and block diagram of an exemplary embodiment of a gas efficiency system of the present disclosure.

FIG. 17 illustrates a series boiler arrangement of boilers 760-763 having inlets and outlets connected to a piping system. Also shown, are a gas meter GM2, a return temperature sensor RT8, an supply temperature sensor ST8 and a water flow meter WF8. A real-time gas efficiency GF of boilers 760-763 is calculated in accordance with the following equation [48].

$$GF_{760-763} = (GPM_{WF8} * (T_{ST8} - T_{RT8}))/GAS_{GM2} \quad [48]$$

where $GF_{760-763}$ is a calculated gas efficiency collectively of boilers 760-763, $T_{RT8}$ is the return temperature (° F.) sensed by return temperature sensor RT8, $T_{ST8}$ is the supply temperature (° F.) sensed by system supply temperature sensor ST8, $GPM_{WF8}$ is the number of gallons per minute flowing through boilers 760-763 past water flow meter WF8, and $GAS_{GM1}$ is the amount of gas flowing into boilers 760-763 past gas meter GM2.

This will enable a tracking of long term performance of boilers 760-763 over the course of a time period.

In practice, more or fewer boilers may be employed, and any serial, parallel or combination of boilers may be employed.

Figure 18:
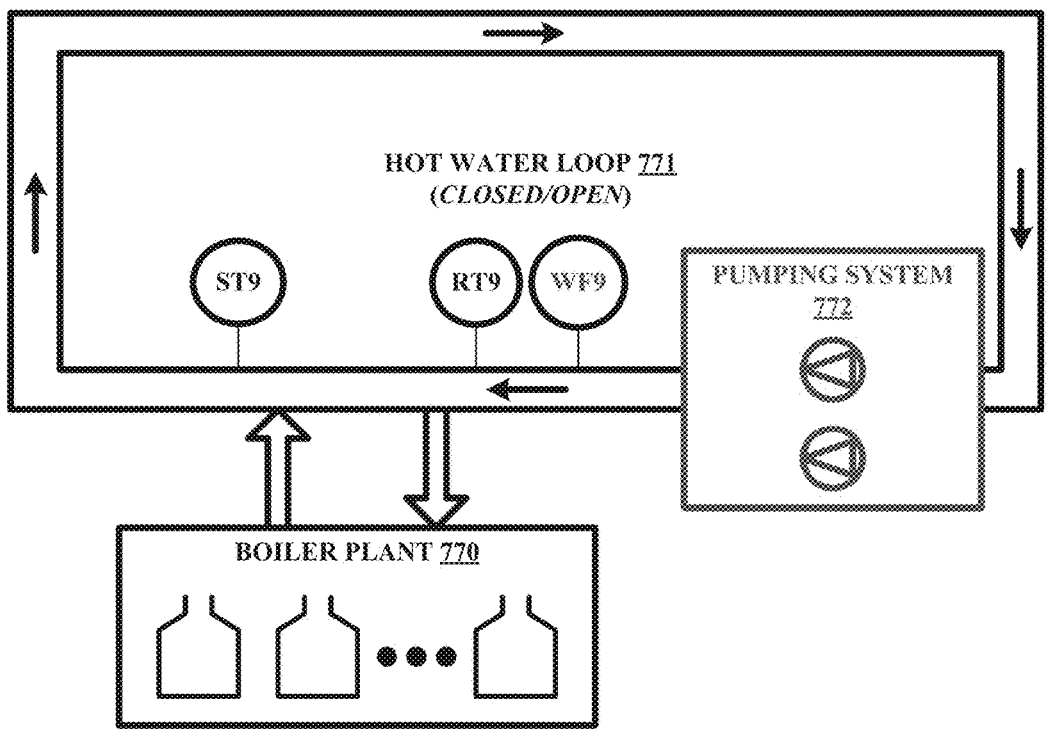
FIG. 18 is a schematic and block diagram of an exemplary embodiment of a pumping system of the present disclosure.

FIG. 18 illustrates a boiler plant 770 employing one or more boilers of any type(s), a hot water loop 771 and a pumping system 772 of one or more pumps of any type(s). Also shown is a water flow meter WF9, a return temperature sensor RT9 and a supply temperature sensor ST9. In practice for multiple-boiler embodiments, boiler plant 770 may have the boilers in any serial, parallel, or combination arrangement relative to hot water loop 771. Similarly, for multiple-pump embodiments, pumping system 772 may have the pumps in any serial, parallel, or combination arrangement relative to hot water loop 771.

Figure 19:
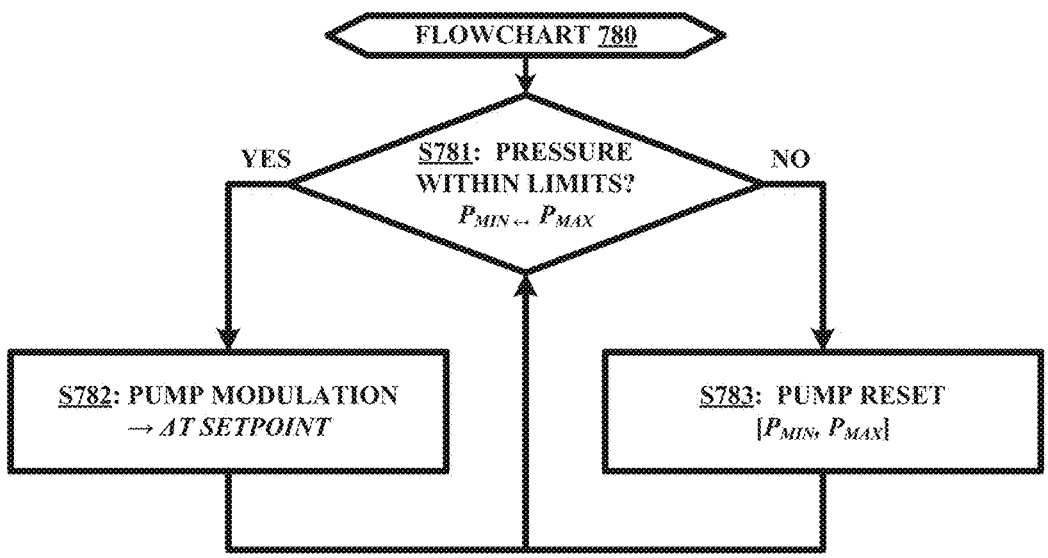
FIG. 19 is a flowchart representative of an exemplary embodiment of a ΔT pumping method of the present disclosure.

FIG. 19 illustrates a flowchart 780 representative of a ΔT pumping method of the present disclosure. Specifically, a stage S781 of flowchart 780 encompasses a determination as to whether pumping system 772 is operating between minimum pressure limit $P_{MIN}$ and maximum pressure limit $P_{MAX}$. If pumping system 772 is operating between minimum pressure limit $P_{MIN}$ and maximum pressure limit $P_{MAX}$, then a stage S782 of flowchart chart 80 encompasses a modulation of pumping system 772 in conformance with a ΔT setpoint for pumping system 772, whereby the ΔT setpoint represents a differential between supply temperature $T_{ST9}$ as sensed by supply temperature sensor ST9 and a return temperature $T_{RT9}$ as sensed by return temperature sensor RT9.

In one embodiment of ΔT setpoint, a reset temperature slope is derived from a graph of a range of water temperature differentials and output air temperature range for pumping system 772. For this slope, one endpoint is plotted as the maximum water temperature differential/minimum outdoor air temperature and the other endpoint is plotted as the minimum water temperature differential/maximum outdoor air temperature, whereby the ΔT setpoint is the water temperature differential on the slope corresponding to a sensed outdoor air temperature.

Referring back to stage S781, if pumping system 772 is not operating between minimum pressure limit $P_{MIN}$ and maximum pressure limit $P_{MAX}$, then a stage S783 of flowchart 780 encompasses a reset of pumping system 772 within minimum pressure limit $P_{MIN}$ and maximum pressure limit $P_{MAX}$.

A pumping system of a chiller plant may also be operated in accordance with flowchart 780.

Two (2) additional features of the present disclosure include a data logger factorization and a low fire/outdoor air modulation.

The data logger factorization is premised on a logging of the energy load and/or other operating points of a boiler plant and/or a chiller plant. Specifically, the data logger may be used as a limiting factor, a floor factor, a ceiling factor, or as any other known factoring variable. For example, historical load on a data logger may be utilized to increase or decrease an initial period of low-fire output for boilers. In this case, the period may be decreased for a historically higher load experienced by the boilers for a particular use or time of day. Alternatively, the period may be increased for a historically lower load experienced by the boilers for a particular use or time of day.

The low fire/outdoor air modulation involves increasing or decreasing an initial period of low-fire output for boilers in dependence on the temperature of the outdoor air. For example, the initial period of low-fire output is increased for an increase in outdoor air temperature and decreased for a decrease in outdoor air temperature.

Again, those having ordinary skill in the art will appreciate the benefits of the process modulation algorithm and various modulation schemes of the present disclosure. Those having ordinary skill in the art of the present disclosure will further appreciate how to apply the equations [29]-[48] to various systems, in particular how to design the various variables of the equations [29]-[48] in view of the particular type of devices to be controlled in accordance with the present disclosure. For example, a system controller may implement the processes/schemes herein via a wired or wireless network with a number X of devices of any type (e.g., boilers, chillers, pumps, dampers, etc.). By further example, a system administrator may execute various stages of processes/schemes herein via a wired or wireless network to device controllers for further stages of processes/schemes herein on behalf of devices (e.g., boilers, chillers, pumps, dampers, etc.).

While the disclosure has been illustrated and described in detail in the drawings and foregoing description, the same is to be considered as illustrative and not restrictive in character, it being understood that only the preferred embodiments have been shown and described and that all changes, modifications and equivalents that come within the spirit of the present disclosure provided herein are desired to be protected. The articles "a", "an", "said" and "the" are not limited to a singular element, and may include one or more such elements.

What is claimed is:

1. A hydronic heating system, comprising:
    a water line for circulating water through a building;
    a plurality of boilers, each boiler being connected to the water line for heating the water flowing through the water line; and
    a control operably coupled to the plurality of boilers, the control including at least one processor configured for calculating a system energy load for operating the plurality of boilers on a heat load assignment basis,
        wherein each boiler is assigned at least a portion of the system energy load, and
        wherein a calculation of the system energy load is a function of a set-point water temperature for the hydronic heating system, a supply water temperature of water flowing relative to a supply point of the water line, a return water temperature of water flowing relative to a return point of the water line and a flow rate of water flowing relative to a flow sense point of the water line.

2. The hydronic heating system of claim 1, wherein the calculation of the system energy load includes
    a calculation of a set-point/supply differential between the set-point temperature and the supply water temperature.

3. The hydronic heating system of claim 1, wherein the calculation of the system energy load includes
    a calculation of a set-point/return differential between the set-point temperature and the return water temperature.

4. The hydronic heating system of claim 1, wherein the calculation of the system energy load includes
    a calculation of a set-point/supply differential between the set-point temperature and the supply water temperature;
    a calculation of a set-point/return differential between the set-point temperature and the return water temperature; and
    a calculation of a temperature summation of the set-point/supply differential and the set-point/return differential.

5. The hydronic heating system of claim 4, wherein the calculation of the system energy includes
    a calculation of a product of the temperature summation, the flow rate of the water flowing relative to a flow sense point of the water line, and a weight of the heat water circulating through the water line.

6. The hydronic heating system of claim 4, wherein the calculation of the system energy includes
    a calculation of a product of the temperature summation, the flow rate of the water flowing relative to a flow sense point of the water line, a weight of the heated water circulating through the water line, and a specified operational time period of the hydronic heating system.

7. The hydronic heating system of claim 1, wherein the calculation of the system energy load includes
    a calculation of a condensing/return differential between a condensing temperature limit and the return water temperature.

8. The hydronic heating system of claim 1, wherein the calculation of the system energy load includes
    a calculation of a set-point/supply differential between the set point temperature and the supply water temperature;
    a calculation of a set-point/return differential between the set-point temperature and the return water temperature;
    a calculation of a condensing differential between a condensing temperature limit and the return water temperature; and a calculation of a temperature summation of the set-point/supply differential, the set-point/return differential, and the condensing/return differential.

9. The hydronic heating system of claim 8, wherein the calculation of the system energy includes
a calculation of a product of the temperature summation, the flow rate of the water flowing relative to a flow sense point of the water line, and a weight of the heat water circulating through the water line.

10. The hydronic heating system of claim 8, wherein the calculation of the system energy includes
a calculation of a product of the temperature summation, the flow rate of the water flowing relative to a flow sense point of the water line, a weight of the heated water circulating through the water line, and a specified operational time period of the hydronic heating system.

11. The hydronic heating system of claim 1, wherein the calculation of the system energy includes
a calculation of a product of the flow rate of the water flowing relative to a flow sense point of the water line, and a weight of the heat water flowing through the water line.

12. The hydronic heating system of claim 1, wherein the calculation of the system energy includes
a calculation of a product of the flow rate of the water flowing relative to a flow sense point of the water line, a weight of the heated water circulating through the water line, and a specified operational time period of the hydronic heating system.

13. The hydronic heating system of claim 1, wherein the plurality of boilers includes at least one condensing boiler.

14. The hydronic heating system of claim 1, wherein the plurality of boilers includes at least one non-condensing boiler.

15. The hydronic heating system of claim 1, wherein the set-point water temperature is a function of an outdoor air temperature relative to the hydronic heating system.

16. The hydronic heating system of claim 1,
wherein the control is configured for independently operating each boiler in a manner that matches the system energy load to operating characteristics of each boiler enabled for heating water flowing through the water line; and
wherein the match of the system energy load to operating characteristics of each enabled boiler includes the heat load assignment of each enabled boiler based on the operating characteristic of each enabled boiler.

17. The hydronic heating system of claim 16, wherein each enabled boiler is independently modulated as a function of a comparison of the heat load assignment of the enabled boiler to a heat output of the enabled boiler.

18. The hydronic heating system of claim 1, further comprising:
for each boiler, a water pump for circulating water through the boiler,
wherein the control is configured to modulate each water pump to maintain a constant temperature differential between an inlet temperature and an outlet temperature of water flowing through a corresponding boiler.

19. The hydronic healing system of claim 18, wherein the water pump is modulated to vary the flow rate of water flowing through the boiler as required to maintain the constant temperature differential between the inlet temperature and the outlet temperature of water flowing through the corresponding boiler.

20. The hydronic heating system of claim 1, wherein the water line is a closed water line.

* * * * *